(12) United States Patent
Gaffey et al.

(10) Patent No.: US 8,041,650 B2
(45) Date of Patent: Oct. 18, 2011

(54) METHOD AND SYSTEM FOR DIRECTED DOCUMENTATION OF CONSTRUCTION PROJECTS

(75) Inventors: Kieran Gaffey, Seattle, WA (US); Howard Marcus, Running Springs, CA (US)

(73) Assignee: Howard Marcus, Running Springs, CA (US)

( * ) Notice: Subject to any disclaimer, the term of this patent is extended or adjusted under 35 U.S.C. 154(b) by 1563 days.

(21) Appl. No.: 11/375,548

(22) Filed: Mar. 14, 2006

(65) Prior Publication Data

US 2006/0242419 A1    Oct. 26, 2006

Related U.S. Application Data

(63) Continuation-in-part of application No. 11/375,543, filed on Mar. 13, 2006, now abandoned.

(60) Provisional application No. 60/661,048, filed on Mar. 11, 2005.

(51) Int. Cl.
    G06Q 10/00    (2006.01)
    G06Q 50/00    (2006.01)
(52) U.S. Cl. ..... 705/342; 705/7.21; 705/7.22; 705/7.23; 705/7.24; 705/301; 715/209; 715/221; 715/277; 715/963; 715/964; 715/965; 707/608; 707/694; 707/731; 726/3; 726/2; 726/16
(58) Field of Classification Search .................. None
    See application file for complete search history.

(56) References Cited

U.S. PATENT DOCUMENTS

| 5,189,606 | A  | * | 2/1993  | Burns et al. | 705/7.23 |
|---|---|---|---|---|---|
| 5,907,850 | A  | * | 5/1999  | Krause et al. | 715/234 |
| 6,836,752 | B2 | * | 12/2004 | Atasoy | 703/1 |
| 6,954,148 | B2 | * | 10/2005 | Pulkkinen et al. | 340/572.1 |
| 7,089,203 | B1 | * | 8/2006  | Crookshanks | 705/37 |
| 7,321,864 | B1 | * | 1/2008  | Gendler | 705/7.15 |
| 7,359,865 | B1 | * | 4/2008  | Connor et al. | 705/10 |
| 7,391,529 | B2 | * | 6/2008  | Glaspy et al. | 358/1.18 |
| 7,565,306 | B2 | * | 7/2009  | Apostolides | 705/7.26 |
| 7,627,765 | B2 | * | 12/2009 | Nakamura et al. | 713/181 |
| 7,698,647 | B2 | * | 4/2010  | Steeb et al. | 715/738 |
| 7,720,865 | B2 | * | 5/2010  | Hashimoto | 707/785 |
| 7,814,122 | B2 | * | 10/2010 | Friedrich et al. | 707/796 |
| 7,899,739 | B2 | * | 3/2011  | Allin et al. | 705/37 |
| 2002/0138391 | A1 | * | 9/2002  | Kroeger | 705/37 |
| 2002/0165723 | A1 | * | 11/2002 | Kroeger | 705/1 |
| 2002/0198755 | A1 | * | 12/2002 | Birkner et al. | 705/8 |
| 2003/0135401 | A1 | * | 7/2003  | Parr | 705/8 |
| 2003/0200062 | A1 | * | 10/2003 | Dessureault et al. | 703/1 |
| 2004/0024623 | A1 | * | 2/2004  | Ciscon et al. | 705/7 |
| 2004/0186757 | A1 | * | 9/2004  | Starkey | 705/7 |
| 2004/0205519 | A1 | * | 10/2004 | Chapel et al. | 715/502 |
| 2005/0038636 | A1 | * | 2/2005  | Wakelam et al. | 703/1 |

(Continued)

Primary Examiner — Syed A. Zia
(74) Attorney, Agent, or Firm — Lowe Graham Jones PLLC

(57) ABSTRACT

Methods and systems for directed creation of construction documentation are provided. Example embodiments provide a Directed Documentation System (a "DDS"), which directs, in a computer-assisted manner, the creation of a historical record of a portion or an entire construction project. In one embodiment, the DDS comprises a directed construction data organization process/component, a directed documentation data acquisition process/component, a construction documentation data retrieval process/component, and a construction documentation data distribution process/component. These components cooperate to direct the documentation of a construction project in a manner that insures that all desired aspects of the project are documented thoroughly and uniformly. This abstract is provided to comply with rules requiring an abstract, and it is submitted with the intention that it will not be used to interpret or limit the scope or meaning of the claims.

49 Claims, 31 Drawing Sheets

U.S. PATENT DOCUMENTS

| | | | |
|---|---|---|---|
| 2005/0039115 A1* | 2/2005 | Gordon et al. | 715/505 |
| 2005/0039118 A1* | 2/2005 | Gordon et al. | 715/513 |
| 2005/0131924 A1* | 6/2005 | Jones | 707/100 |
| 2005/0144126 A1* | 6/2005 | Commodore et al. | 705/40 |
| 2005/0171790 A1* | 8/2005 | Blackmon | 705/1 |
| 2005/0188299 A1* | 8/2005 | Furman et al. | 715/513 |
| 2005/0222923 A1* | 10/2005 | Lambright | 705/30 |
| 2006/0015475 A1* | 1/2006 | Birkner et al. | 707/1 |
| 2006/0149658 A1* | 7/2006 | Smith | 705/37 |
| 2006/0170961 A1* | 8/2006 | Saijo et al. | 358/1.15 |
| 2006/0185275 A1* | 8/2006 | Yatt | 52/236.1 |
| 2006/0218185 A1* | 9/2006 | Lemke | 707/104.1 |
| 2006/0277007 A1* | 12/2006 | Wakelam et al. | 703/1 |
| 2007/0027732 A1* | 2/2007 | Hudgens | 705/7 |
| 2007/0186160 A1* | 8/2007 | McArdle et al. | 715/700 |
| 2007/0283267 A1* | 12/2007 | Jeffery et al. | 715/710 |
| 2008/0307321 A1* | 12/2008 | Long | 715/752 |
| 2009/0234696 A1* | 9/2009 | Attia | 705/8 |
| 2010/0057752 A1* | 3/2010 | Kikuchi | 707/10 |
| 2011/0072019 A1* | 3/2011 | Fukasawa | 707/737 |

\* cited by examiner

| Actual Date | Revision | Projected Date From | Projected Date To | Location 1 | Location 2 | Level | Orientation | Cost Code |
|---|---|---|---|---|---|---|---|---|
| 1/19/2005 | | | | HOTEL | ROOM 962 BATH | 9 | 9 | |
| 1/19/2005 | 🚩 | | | HOTEL | ROOM 962 BATH | 9 | 9 | |
| 1/19/2005 | | | | HOTEL | ROOM 962 BATH | 9 | 12 | |
| 1/19/2005 | 🚩 | | | HOTEL | ROOM 962 BATH | 9 | 7 | |
| 1/19/2005 | | | | HOTEL | ROOM 962 BATH | 9 | 7 | |
| 1/19/2005 | 🚩 | | | HOTEL | ROOM 962 CLOSET | 9 | 3 | |
| 1/19/2005 | | | | HOTEL | ROOM 962 MAIN | 9 | 3 | |
| 1/19/2005 | | | | HOTEL | ROOM 962 MAIN | 9 | 8 | |
| 1/19/2005 | | | | HOTEL | ROOM 960 MAIN | 9 | 10 | |
| 1/19/2005 | | | | HOTEL | ROOM 960 MAIN | 9 | 3 | |
| 1/19/2005 | | | | HOTEL | ROOM 960 MAIN | 9 | 2 | |
| 1/19/2005 | 🚩 | | | HOTEL | ROOM 960 MAIN | 9 | 3 | |
| 1/19/2005 | | | | HOTEL | ROOM 960 MAIN | 9 | 9 | |
| 1/19/2005 | | | | HOTEL | ROOM 960 BATH | 9 | 12 | |
| 1/19/2005 | | | | HOTEL | ROOM 960 BATH | 9 | 3 | |
| 1/19/2005 | | | | HOTEL | ROOM 960 BATH | 9 | 12 | |
| 1/19/2005 | | | | HOTEL | ROOM 960 BATH | 9 | 7 | |
| 1/19/2005 | | | | HOTEL | ROOM 960 ENTRY | 9 | 7 | |
| 1/19/2005 | | | | HOTEL | ROOM 960 BATH | 9 | 10 | |
| 1/19/2005 | | | | HOTEL | ROOM 958 BATH | 9 | 3 | |
| 1/19/2005 | | | | HOTEL | ROOM 958 BATH | 9 | 9 | |
| 1/19/2005 | | | | HOTEL | ROOM 958 BATH | 9 | 12 | |

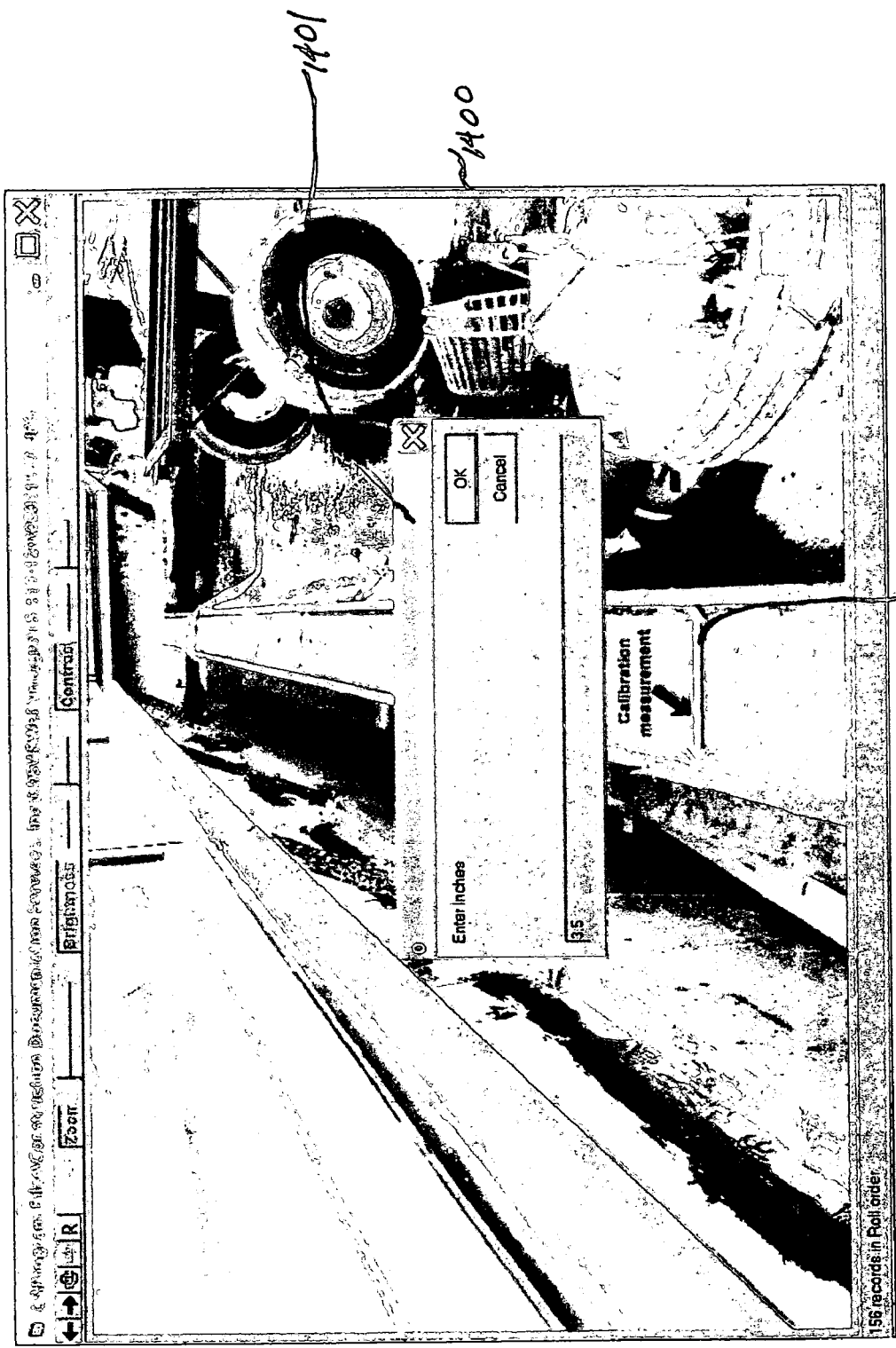

METHOD AND SYSTEM FOR DIRECTED DOCUMENTATION OF CONSTRUCTION PROJECTS

TECHNICAL FIELD

The present disclosure relates to methods, processes, and systems for documenting aspects of a construction process and, in particular, to methods, processes, and systems for integrating images and text automatically with other documentation of a construction project according to a process directed by a documentation system.

BACKGROUND

Construction projects present major complications to the ability to accurately assess time, progress, and quality at all stages and tasks of a project. This phenomenon is partially due to the inherent nature of construction to permanently cover earlier work. Critical elements are continually covered and increasingly inaccessible after the fact. If the work relating to a particular task is not assessed at the right moment in time, it may become impossible to assess. Furthermore, the pace and multi-disciplined subcontracting approach of modern construction leads to numerous simultaneous tasks, which makes tracking each task at the correct time all the more challenging.

The difficulty in determining the conditions and exact time frames in which each task is completed, especially in a large construction project, is an industry wide challenge. These determinations are important in defining payment schedules, code compliance, legal claims legitimacy, quality control, and maintenance procedures. Better determinations can lead to early corrections of design issues, fewer misunderstandings, better compliance with codes, cost containment, and the like.

The industry has evolved numerous ways to track and control information surrounding construction. Such information may include condition and progress information, for example, what dates and times particular activities or tasks have been performed; who has performed them; whether they have been performed as specified by the construction documents, for example, using specified materials, techniques, etc.; what adjustments have been made that diverge from the plans; whether the activity or task is complete, or the portion completed; etc. Traditionally, these tracking methods center around written paper reports that are discipline specific received from sub-contractors, which are manually compiled by the general contractor (or other personnel in charge) and then submitted to the owner. Often owners engage their own representative to observe and report on the condition and progress of a project as it is progressing. Current commercially available construction management software endeavors to track and combine many different types of traditional paper documents into one system. However, there is no mechanism for insuring who's view of the world is correct.

BRIEF DESCRIPTION OF THE DRAWINGS

FIGS. 7A-7C are example screen displays of a list view of an example directed documentation data viewer.

FIGS. 8A-8B are example screen displays of a detail view of an example Directed Documentation System data viewer.

FIG. 9 is an example screen display of a selection view of an example Directed Documentation System data viewer.

FIGS. 14A-14B are example screen displays of an electronic quick measurement tool that can be used to obtain measurements of construction elements that appear in approximately the same vertical plane as an element with a known measurement.

DETAILED DESCRIPTION

Figure 1:
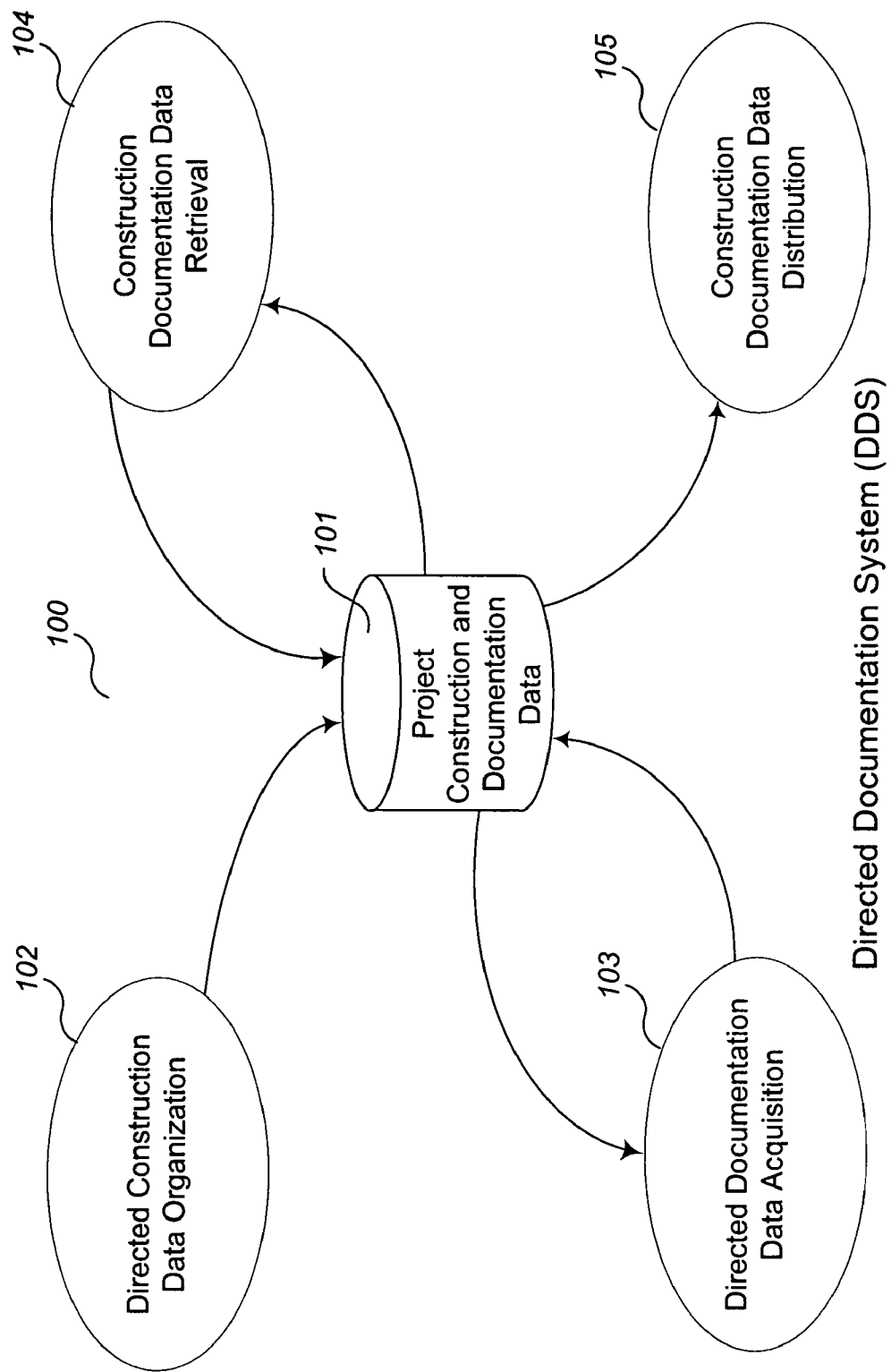
FIG. 1 is a block diagram of logical components an example Directed Documentation System.

Embodiments described herein provide enhanced computer- and network-assisted methods and systems for comprehensive electronic documentation of construction projects that automatically produces a visual and written history of ongoing and completed construction. Example embodiments provide a Directed Documentation System ("DDS"), which enables its users to collect, manage, organize images with other construction contract data to document a construction project in a planned, more automated fashion. The DDS directs the documentation of a construction project in a manner that insures that desired aspects of the project are documented thoroughly, using uniform terminology across disciplines within the project, according to a set of well established industry standards, and in a manner that insures the integrity of the documentation data. The Directed Documentation System creates for each project a unique electronic library of photographic surveys and other electronic documents, which are stored in a format that permits retrieval of both written and photographic detail.

The acquisition of documentation data is directed by a computer-assisted process that is adjusted on an ongoing basis to react to the realities of construction such as time delays, sub-contractor difficulties, etc. The documentation data acquisition process takes into account a continually revised documentation schedule and the protocols and parameters introduced into each project initially and in response to changes that occur and evolve during the construction process. This continuous and directed data acquisition results in a historical library of photographs and other data that documents construction details and timeframes for each targeted construction activity (one or more tasks) in a manner that is independent from those designing, commissioning, and performing the tasks. Moreover the documentation data can be verified for content, accuracy, and consistency prior to its integration into an DDS data repository.

The data gathered and integrated into the Directed Documentation System creates a planned record of construction activities, progress, compliance and quality. The DDS data records stored in the DDS data repository can ultimately provide the core data for pre-condition surveys; aid in providing as-built documentation; provide inspection clarification information, be used for future building operations, maintenance, expansion, and renovation; provide an indisputable record for legal claims and claims avoidance, identifies a basis for determining fair value of work performed; and provide other documentation such as an historical record, public relations related documentation, etc. However, that the techniques of Directed Documentation System may be useful to create a variety of other types of documentation as well. DDS created data can be distributed in hard medium, over networks and/or through a web browser interface.

In addition, reports based upon DDS created data can be automatically distributed electronically, such as by email or other automatic or semi-automatic feed, at determined time intervals (e.g., monthly), at determined construction activity related times (e.g., when a progress payment is due), at calculated times (e.g., such as every third day), after particular and/or in response to triggering events such as notifications that are programmed into the documentation schedule and updated as the construction project progresses (e.g. when an activity is supposed to have been completed under the contract but is observably late). Reports can be predetermined progress payment reports triggered by events in the documentation schedule or can be customized to report project progress, various aspects of the construction (such as everything related to drywalling activities or internal plumbing), and/or various features of the construction (such as the West side of the building). The distribution of data provides clients with remote monitoring capabilities by allowing continual and even near real-time monitoring of progress, changes and refinements to the project. As used herein, near real-time is relative to the construction—it can mean anything from being able to observe the construction as it is being built (such as when the data acquisition occurs and is downloaded and integrated almost immediately into a DDS computer system as it is being acquired) to within days of the activity.

The Direct Documentation System also allows identification of project wide issues and allows early, collaborative, resolution to problems. Automatic notifications of particular types of discrepancies can also aid in early detection and resolution of problems. The DDS can track and document to completion all types of construction related issues. In addition, the DDS adds an aspect of security to the documentation process. For example, chain of custody can be preserved by tracking the ordering in which images are captured, modified etc. In some embodiments, the DDS issues two separate media copies of the raw documentation data capture, which are sealed as evidence and archived offsite. In the event of a lawsuit, a party can prove that the images were not retouched or changed out of sequence. The end result of directed documentation techniques is that they produce potential benefit in terms of timely contract closeout, overall schedule, cost containment, system performance and the quality of the finished construction.

FIG. 1 is a block diagram of logical components an example Directed Documentation System. The DDS 100 logically comprises five different components including a project construction and documentation data data repositiory 101 (also referred to as the DDS repository), a directed construction data organization component 102 (also referred to as the data organization component), a directed documentation data acquisition component 103 (also referred to as the data acquisition component), a construction documentation data retrieval component 104 (also referred to as the retrieval component), and a construction documentation data distribution component 105 (also referred to as the distribution component). The functionality of these various components may be distributed differently and/or repeated between the components.

As one can observe from FIG. 1, the construction data as derived from the various project contract documents by the data organization component 102, is stored in the DDS data repository 101. This data is used by the data acquisition component 103 to derive a documentation schedule. The documentation schedule is a continually adjusted detailed work plan of potentially the entire construction project from start to finish. This work plan identifies areas that need to be recorded (documented); creates a process to track the documentation of these areas; registers events that can be used to trigger automatic notification or reports; registers landmark events such as points in the construction where activity completion is to occur. Landmark events may trigger instructions to the data acquisition instructions to conduct verification documentation tasks. Note that as requested by a client, only a portion of the project may be subject to the DDS process, and, in that case, the documentation schedule reflects the period and/or specific construction disciplines and/or construction activities to be documented.

The documentation schedule reflects the realities of the job—what construction (and documentation) has been actually accomplished and within what actual time periods, is reflective of actual field conditions, and is adjusted to account for critical path issues—rather than simply mirroring the construction schedule. To do this, the documentation schedule is adjusted by the DDS 100 as the DDS 100 receives input from the field that indicates discrepancies or information that somehow conflicts with current entries in the documentation schedule. The documentation schedule can be implemented in a computer system using any conventional means that permits activities, descriptions, instructions, and notification triggers to be associated with calendared entries.

The documentation schedule (along with other protocols and parameters such as uniform terminology) is used to drive and direct the data acquisition component 103 to produce directed documentation data acquisition instructions (referred to also as data acquisition instructions). For example, such data acquisition instructions may be produced on a daily basis and given to field personnel to capture images and related text or other data to document the project as instructed. Appendix A, incorporated herein by reference in its entirety, is an example of a portion of such directed documentation data acquisition instructions. For each documentation activity, the field (the data capturer person/entity/device) is provided with a set of "imagery zones," i.e., aspects to capture as documentation. Note that although this description primarily refers to field personnel as the entity responsible for acquiring the images and other documentation data, as technology becomes more and more sophisticated, it is contemplated that much of the directed data acquisition could be accomplished by on-site cameras, controlled remotely, or by other types of robotics modules. Also, one should note that audio (e.g., voice annotation) could be integrated into the documentation data in a similar manner to text.

Once the documentation data is acquired it is integrated into the DDS repository and used to update the documentation schedule. At any time, the construction documentation data in the DDS can be retrieved on a selective basis or explored using, for example, construction documentation data retrieval component 104 such as a DDS viewer described below in detail with respect to FIGS. 7A-16B. In addition, at periodic times, determined times, or upon request, the data distribution component 105 can be invoked to distributed documentation data stored in the DDS repository 101 electronically or paper copy.

Figure 2:
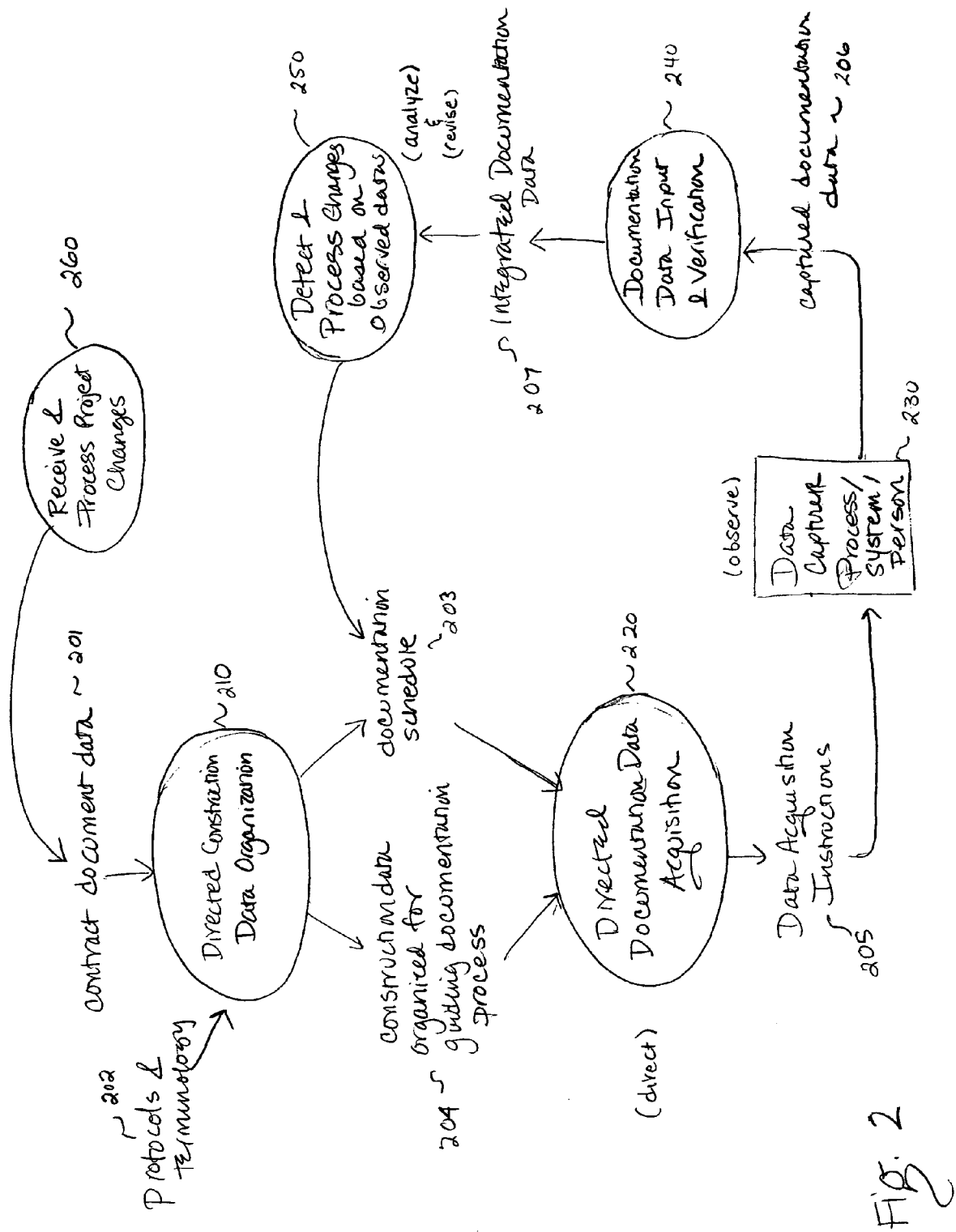
FIG. 2 is an example block diagram of an overview of the documentation and feedback processes used by an example Directed Documentation System to direct and insure the acquisition of timely documentation data.

FIG. 2 is an example block diagram of an overview of the documentation and feedback processes used by an example Directed Documentation System to direct and insure the acquisition of timely documentation data. In FIG. 2, the directed construction data organization process 210 takes in the contract documentation data 201 and a set of protocols and terminology 202 and generated a documentation schedule 203 and stores a set of construction data 204 organized for guiding the documentation process. From the schedule 203 and the protocols and terminology 202, the directed documentation data acquisition process 220 produces the data acquisition instructions 205 on a designated based to direct the capture of documentation in the field. These are forwarded electronically or otherwise as appropriate to a data capturer 230 to observe and document the construction site. The data capturer 230 documents the construction project as directed by the instructions 205 recording images (digital or otherwise) and associated text, audio, or other types of supplemental data in whatever form it is captured. The captured documentation data 206 is then sent (forwarded, downloaded, or otherwise communicated) to a documentation data input and verification process 240 to be integrated into the DDS data repository. The verification process may consist of actions such as enhancing the image using conventional or proprietary image enhancement software, checking to make sure that the image makes sense to the associated CSI code and location indications, and that the comments inserted by the field make sense. The integrated documentation data 207 is then examined to detect inconsistencies with the documentation (and construction) schedule and then the schedule is adjusted to accommodate the realities of the construction progress, conditions, etc. For example, if the data capturer has been asked to verify that a construction activity has been completed, and the documentation data shows that it is not, then the documentation schedule is adjusted to continue to request verification until the activity is complete. Also, potentially, notifications are automatically distributed, along with the documentation data supporting the notification, to personnel that have registered an interest in receiving information with respect to completion of this activity. The detection and adjustment process is currently performed manually in an exemplary implementation. However, as text and image recognition software become more sophisticated and robust, a large portion of such detection and schedule adjustments may be able to be performed automatically by a computer system.

In addition to adjustments made to the documentation schedule, the DDS may at different times through a process 260 receive notification of a change indication to some aspect of the construction project. Such notification may come in many forms, including change orders, architectural supplemental instructions ("ASIs"), and requests for information ("RFIs"). When notification of such change indications are received, the contract document data 201 are appropriately adjusted (for example, by inserting copies of the change indication documents into the system). These adjustments to the contract documentation data 201 then trigger the data organization process 210 to adjust the construction data 204 and the documentation schedule 203 as appropriate. Then, the next time data acquisitions instructions 205 are issued, they will take into account updates that have been made to the construction data 204 and the documentation schedule 203.

Figure 3:
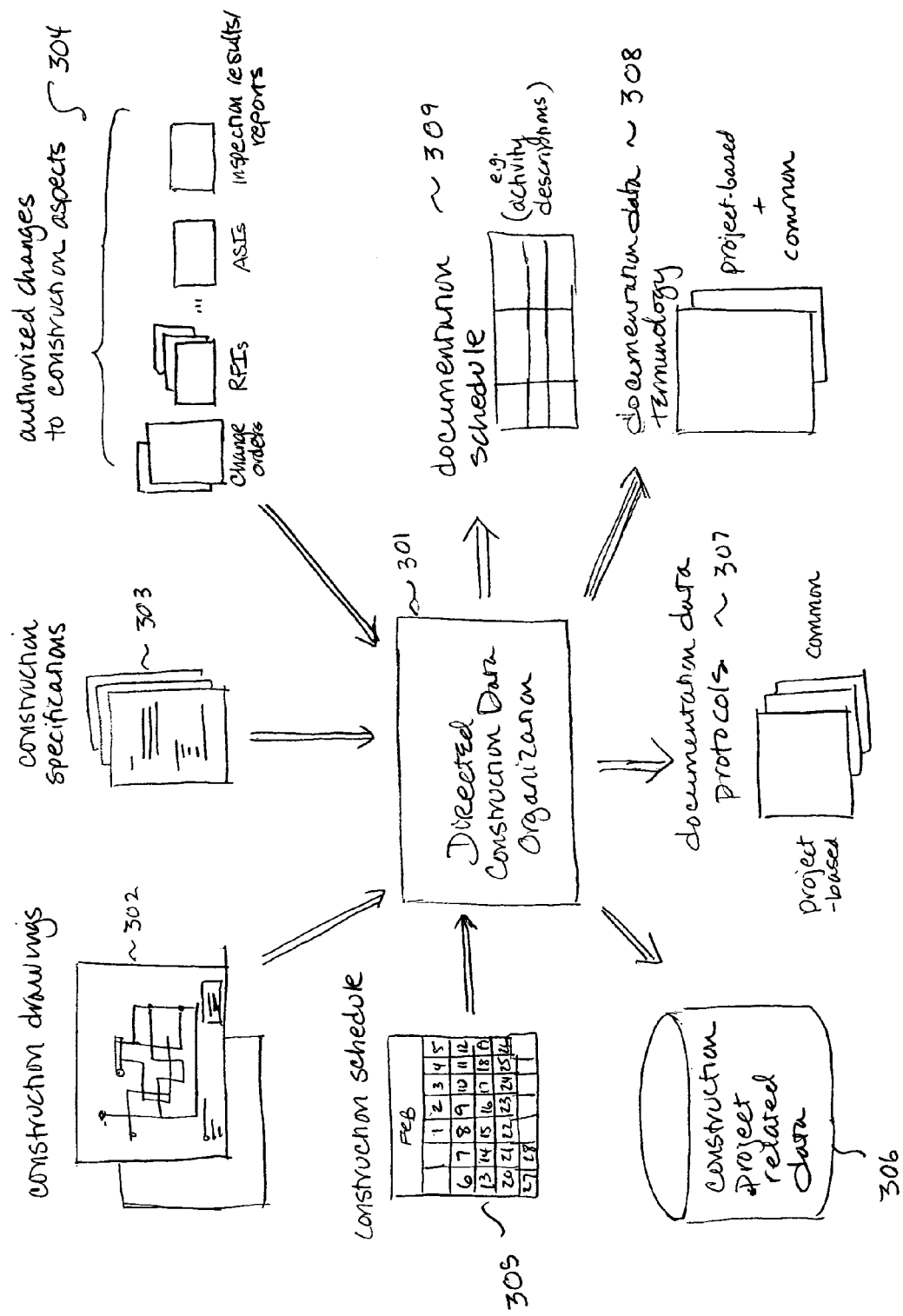
FIG. 3 is an example block diagram of the example inputs to and outputs generated by a directed construction data organization component of a Directed Documentation System.

FIG. 3 is an example block diagram of the example inputs to and outputs generated by a directed construction data organization component of a Directed Documentation System. As described with reference to FIG. 2, the directed construction data organization component 301 receives data related to the construction project contract documents and produces several different outputs that are used to guide the data acquisition process. In one example embodiment, the contract documents include construction drawings 302, construction specifications 303, authorized change indications 304 (e.g., COs—change orders, RFIs, ASIs, inspection reports/results, etc.), and a construction schedule (including, for example, critical path indications as needed). The data organization process 301 then organizes this contract data and produces construction project related data 306 for documentation use, documentation protocols 307 and documentation data terminology 308 as described further below, and a documentation schedule 309. As described with reference to FIG. 2, the outputs 306-309 of the data organization process 301 are used to derive and generate directed documentation data acquisition instructions.

Example embodiments described herein provide applications, tools, data structures and other support to implement a Directed Documentation System to be used for documenting construction projects. Other embodiments of the described techniques may be used for other purposes, including for evaluation of structure, systems, and contents for preparation of insurance policies, forensics studies of construction or systems failures, etc. In addition, the described techniques could be used to create an accurate inspection schedule that is automatically transmitted to government building inspectors. Also, DDS documentation data and reports can be used by oversight authorities to insure that regulations are being met, etc. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc.

Also, although certain terms are used primarily herein, other terms could be used interchangeably to yield equivalent embodiments and examples. For example, it is well-known that equivalent terms in the construction field and in other similar fields could be substituted for such terms as "contract documents," "construction specification," etc. Also, as used herein, the term "image" is not limited to traditional photographs and may include other types of image generation such as time lapse video, thermography (infrared), and X-ray, sonar, and boroscope images, etc. Also where the term "text" is used, it is to be understood that text includes any data in alphanumeric form, including digital data and symbols. Also, where text is referred to, audio could also be substituted or used to supplement the text. In addition, terms may have alternate spellings which may or may not be explicitly mentioned, and all such variations of terms are intended to be included.

Figure 4:
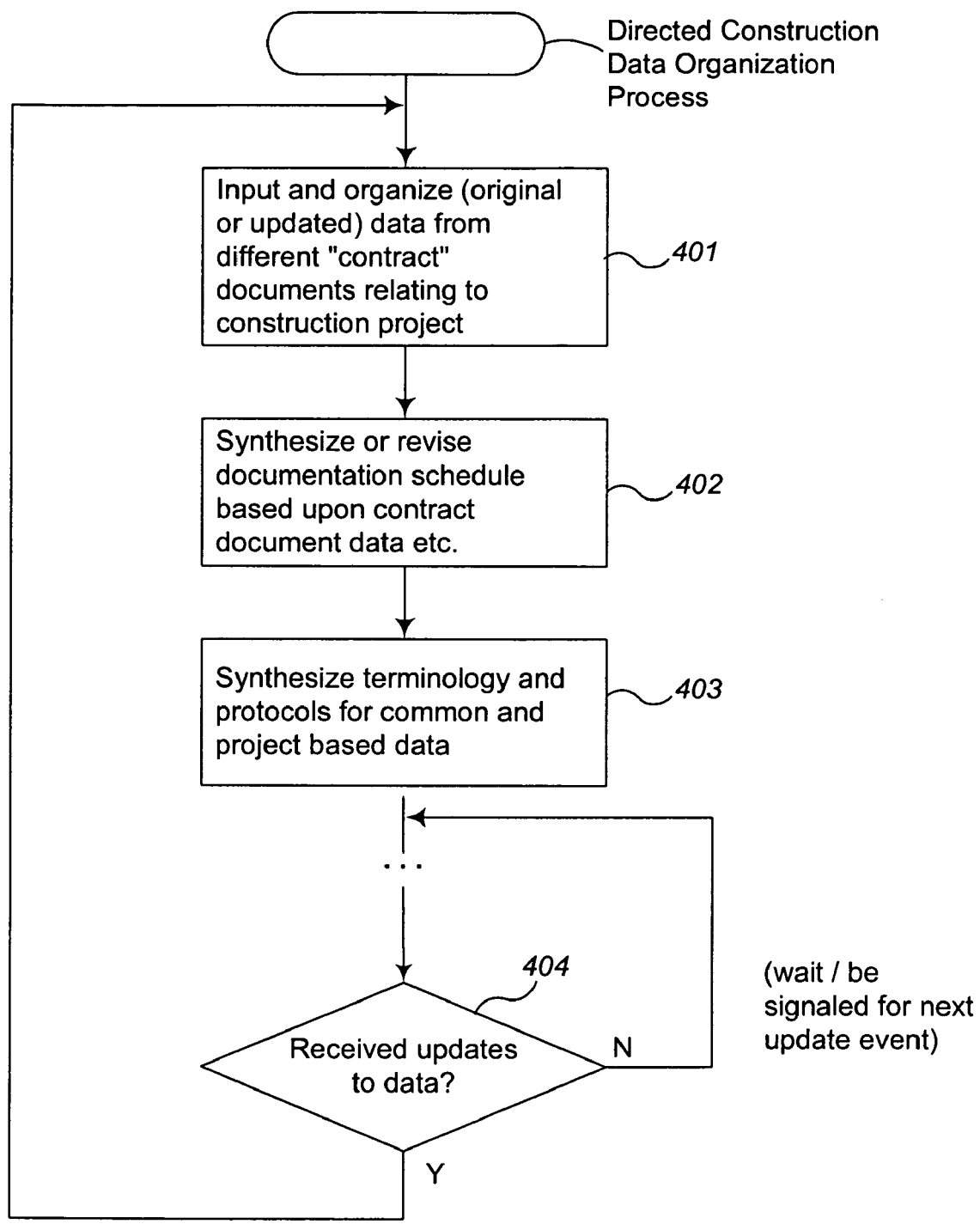
FIG. 4 is an example flow diagram of a process used by the directed construction data organization component to organize construction data so that it can be scheduled for timely and accurate documentation.

FIG. 4 is an example flow diagram of a process used by the directed construction data organization component to organize construction data so that it can be scheduled for timely and accurate documentation. In steps 401, the data organization process inputs and organizes either original or updated (as described with respect to FIG. 2) data from the various contract documents 302-305. In step 402, these data are examined to synthesize (or revise) the documentation schedule. In step 403, the process synthesizes terminology and protocols for common and project based data as described further below. Then in step 404, the DDS (either through this process or some other event handling mechanism awaits updates to the contract data. When updates are received, the process begins again in step 401 to process the revised data; otherwise, the process continues to wait or be notified of additional changes to the construction contract data.

Figure 5:
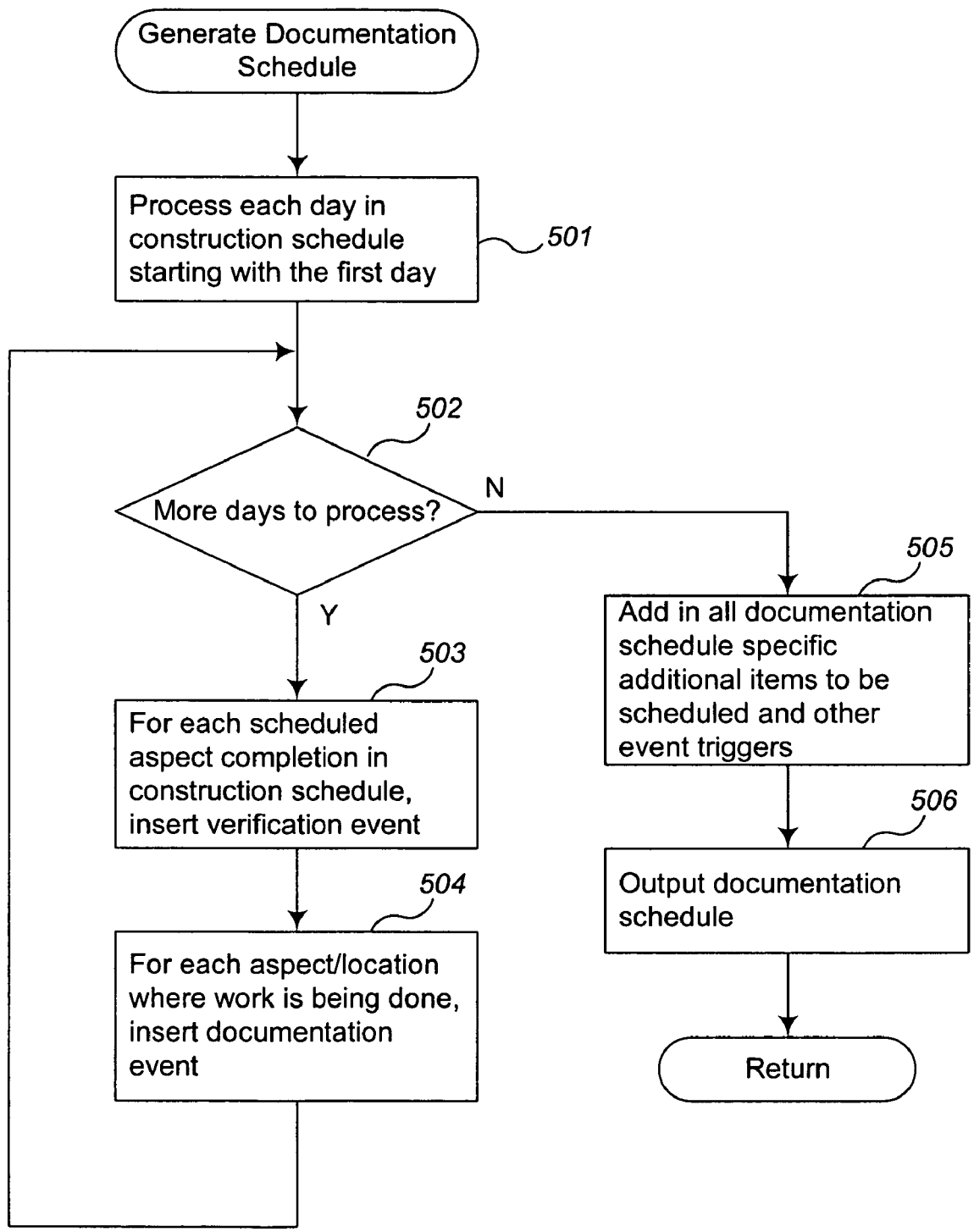
FIG. 5 is an example flow diagram of an example process used to generate a documentation schedule from construction contract document data.

FIG. 5 is an example flow diagram of an example process used to generate a documentation schedule from construction contract document data. For purposes of easier explanation, it is assumed that the construction schedule (or critical path management "CPM" documents) divisions (e.g., "days") are used to generate the documentation schedule. It is understood that other divisions may be similarly incorporated. In step 501, each day of the construction schedule is examined starting with the first. In step 502, the process checks to see if there are any more days to process and, if not, proceeds with step 505, else continues in steps 503. In step 503, the process goes through each aspect of the construction project that is scheduled for completion that day, and inserts a "verification event" into the documentation schedule. Verification events are a type of documentation event that can be used to trigger the insertion of verification instructions into the data acquisition instructions distributed to the data capturer and to trigger automatic notifications to construction project related personnel. In addition, automatically produced and distributed progress payment reports may be triggered by verification events. In step 504, for each aspect of construction or location where work is to be performed, the process inserts a documentation event, with sufficient information so that documentation event instructions can be appropriately generated as part of the documentation data acquisition instructions. The process then returns to step 502 to process any remaining days on the construction schedule. When the construction schedule is exhausted and no more days remain to be processed, then in step 505 the process adds any additional items to the documentation schedule. For example, specific events that are initiated by the documentation schedule itself (such as tallying numbers of images in different disciplines) are also entered into the documentation schedule. Also, other desired event triggers are inserted into the documentation schedule. In step 506, the documentation schedule is then output in the appropriate manner, such as stored in the DDS data repository.

Figure 6:
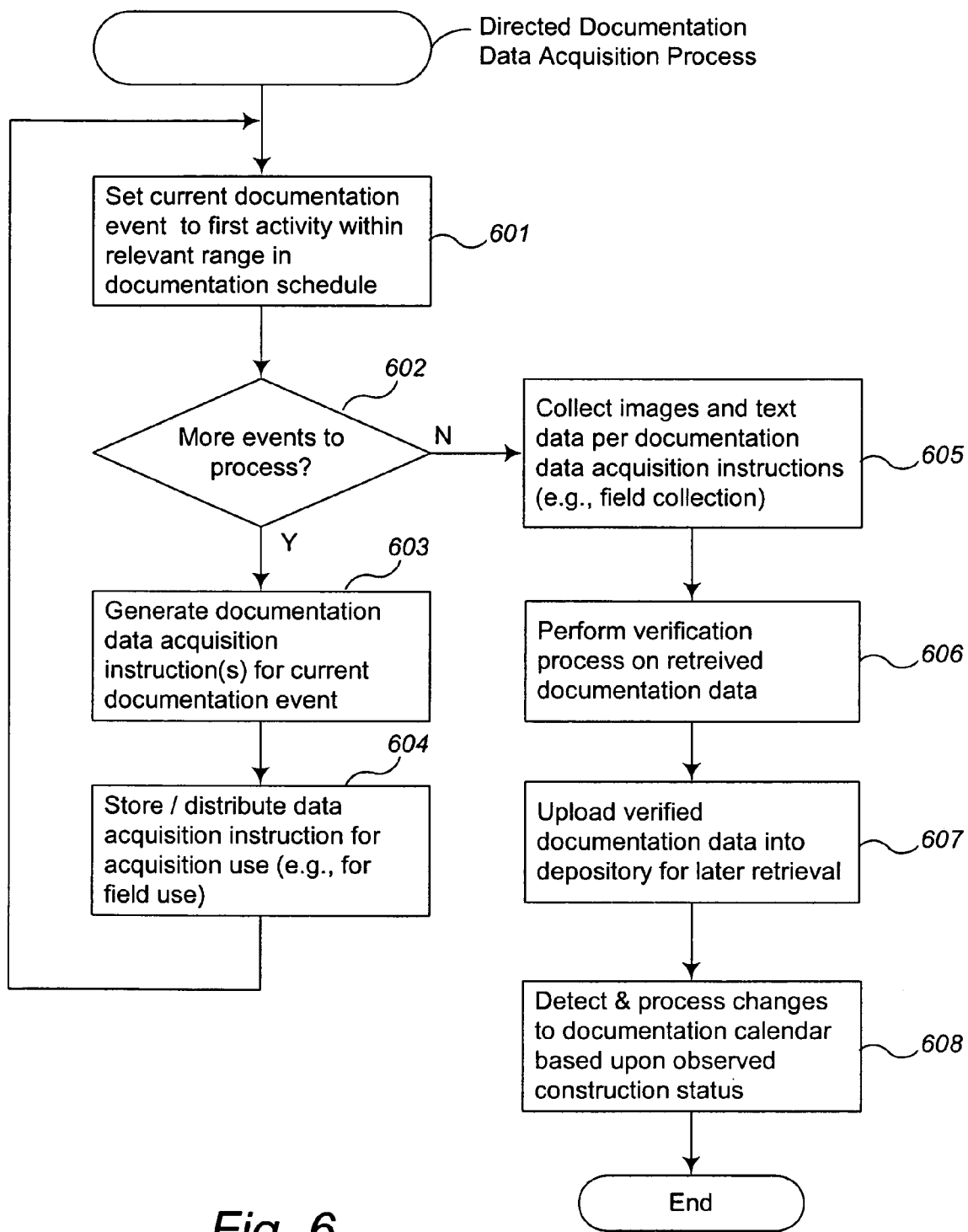
FIG. 6 is an example flow diagram of a process used by an example Directed Documentation System to direct the timely and accurate documentation of a construction project.

FIG. 6 is an example flow diagram of a process used by an example Directed Documentation System to direct the timely and accurate documentation of a construction project. The DDS process loops over the documentation schedule to generate a set of documentation data acquisition instructions that are distributed to a data capturer. Recall that a data capturer may be a person such as a field representative, but may also or instead be a system, device, or other type of entity. More specifically, in step 601, the process examines the first activity within the relevant range in the documentation schedule. The relevant range may be for example, daily, weekly, monthly, or hourly. Or, if the documentation schedule is arranged by discipline, appropriate adjustments are made to the process exemplified by FIG. 6. In step 602, the process determines whether there are more documentation events to process, and, if so, continues in step 603, otherwise continues in step 605. In step 605, the process generates documentation data acquisition instruction(s) for the current documentation event (or verification event) being processed. As much as possible, these documentation data acquisition instructions are generated automatically by a computer system associated with the DDS, although they may be augmented manually.

Directed documentation data acquisition instructions typically include a set of detailed descriptions of the desired documentation organized by location. Other organizations of the instructions can be supported. Appendix A is an example of data acquisition imagery descriptions that drive what images the data capturer is responsible to capture. Although of course other information or different information can be made available to the data capturer, Appendix A shows for each relevant location as determined by the documentation schedule, a "subject" that is to be documented along with a checklist to make sure certain aspects of the construction are captured, and one or more Construction Standards Institute ("CSI") codes for indexing the information. Note that the descriptions are provided as part of a checklist, in which location checklists can be expanded or collapsed for presentation purposes using conventional spreadsheet techniques. Other techniques for presenting the information can also be used. Each location is typically specified by a primary location, augmented by one or more sub-locations. An example listing of CSI codes that can be used for instruction and indexing purposes is included as Appendix B, which is incorporated herein by reference in its entirety.

Directed documentation data acquisition instructions also typically include a set of protocols that may be common across multiple construction projects or that may be specific to the project at hand. These protocols include additional general instructions to the field for capturing images. For example, the data acquisition instructions typically instruct the data capturer to always look out for and record the following items:

things that should be done in a particular manner in any construction project based upon industry "know-how" (e.g., "dewatering wells should always pump to filtration tanks");

all physical activity—what do you see happening in various locations;

all equipment being used—to the level of manufacturer, model, etc.;

notable site conditions (e.g., weather, acts of god; noticed delays, things being done that aren't in the construction schedule, etc.);

all people on site—who and how many;

all material being used to the level of manufacturer, part numbers, etc.;

notable bad quality issues (e.g., insulation has been installed that doesn't reach all the way to the roof); and documentation techniques, such as a detail or close-up is always accompanied by a long shot to establish reference for the end user.

Example guidelines, particular based upon industry "knowhow" are shown in Appendix C, which is incorporated herein by reference in its entirety. Other protocols can be incorporated as needed into any implementation of the data acquisition instructions.

Note as well that all of the data acquisition instructions, including the imagery descriptions and the protocols, are communicated using a set of uniform terminology. Typically, the terminology includes some terminology that is common across the entire DDS—such as naming conventions for what orientation should be used to capture an image—and some terminology that may be project specific—such as the names of various sub-locations ("tower A"). For example, common terminology may include that "elevation" is a head-on view (e.g., a side of a building) that corresponds to elevations in the construction drawings; "details" correspond to the detail boxes on construction drawings; and direction overview commands such as "west overview" or "east overview" corresponds to taking an image looking in the requested direction; and "plan" corresponds to construction drawings and reflects capturing an image from above.

Returning to FIG. 6, in step 604, the data acquisition instructions are then distributed to the data capturer, and the process returns to the beginning of the loop in step 601 to process the next documentation event. When all of the documentation events in the applicable range have been processed, the process continues in step 605 where the data capturer collects/records images and textual data per the documentation data acquisition instructions. The data capturer records images according to the imagery descriptions and the protocols contained in the data acquisition instructions and typically the recording interface prompts the capturer to record additional information associated with each image. For example, the capturer may be prompted to record whether a construction activity is still "open" or "completed" (such as if requested to provide completion verification), augmentation of CSI codes, additional comments—for example a possible note concerning requesting immediate notification of observed data, and a notification toggle to indicate a request for immediate notification of observed data. The data capturer may also be prompted to provide additional location information and other information such as temperature, humidity and other indications of environmental conditions. In addition to a data capturer such as a field representative, data capture may also be performed by remote cameras set in fixed locations during the duration of the project or by other systems or devices. They may be used to broadcast a live picture as well as being streamed and archived in the DDS data repository for future use. Also, remote sensing devices can be incorporate to automatically capture data that is forwarded (for example, by streaming) into the DDS data repository directly. For example, temperature and humidity sensors can generate data automatically and be programmed remotely.

In step 606, the DDS process performs verification on the collected documentation data (images and text), and in step 607, the verified documentation data is uploaded into the DDS data repository for later retrieval. As described earlier and shown here in step 608, the DDS process also detects discrepancies between what is observed in the field and the documentation schedule and processes updates to the documentation schedule accordingly. This insures that future generation of documentation data acquisition instructions will be accurate to the actual timing and condition of the construction project as it progresses As described with respect to FIG. 1, once the DDS has uploaded documentation data in the form of images and text, various clients (viewers, users, construction personnel and the like) can retrieve and manipulate images for a variety of uses.

FIGS. 7A-16B are example screen displays of a viewer for viewing, retrieving, and working with documentation data produced by an example Directed Documentation System. In one embodiment of a DDS viewer, three different views plus an image view, are available for presenting and managing DDS documentation data.

Figure 7B:
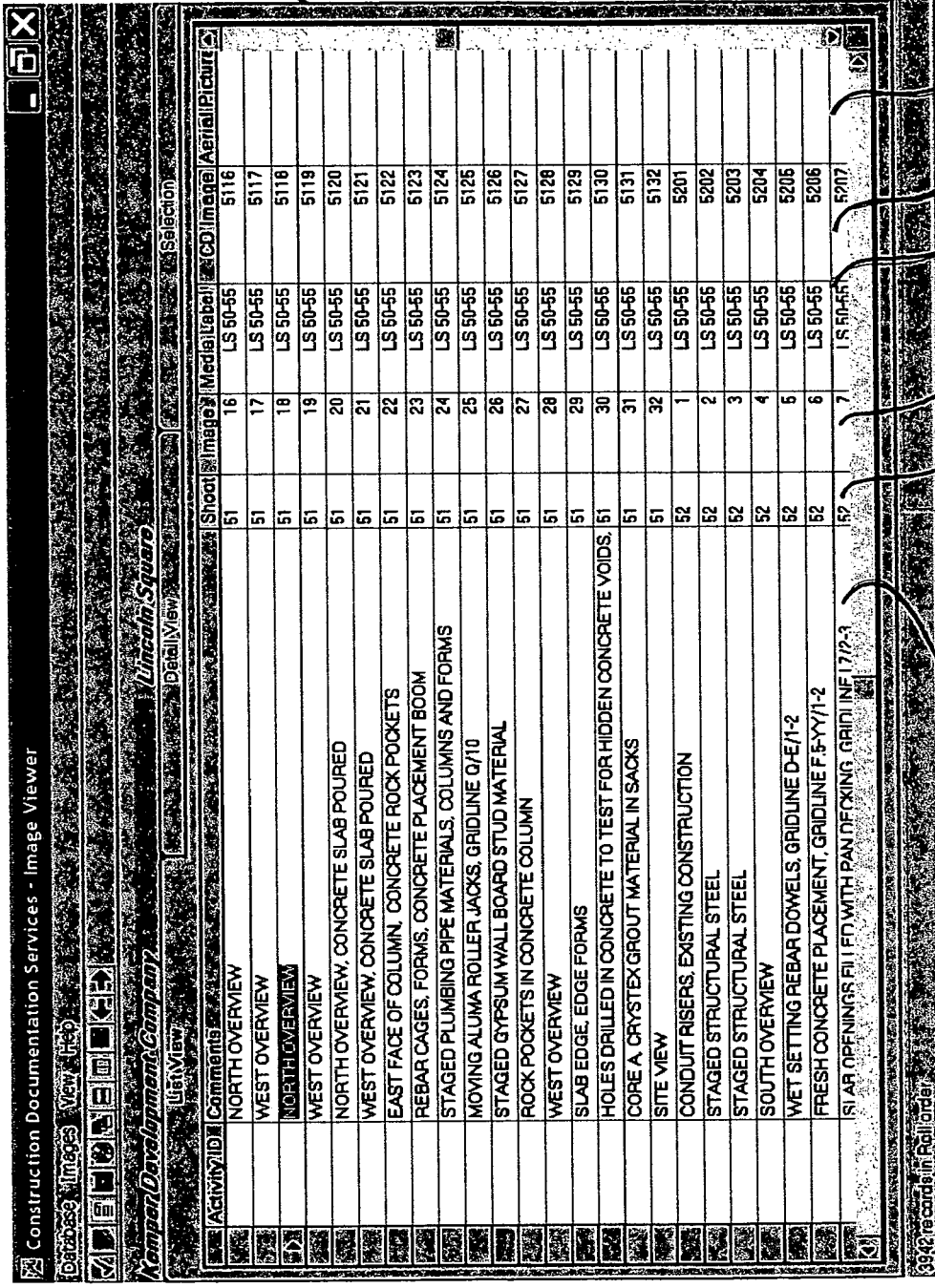
Figure 7C:
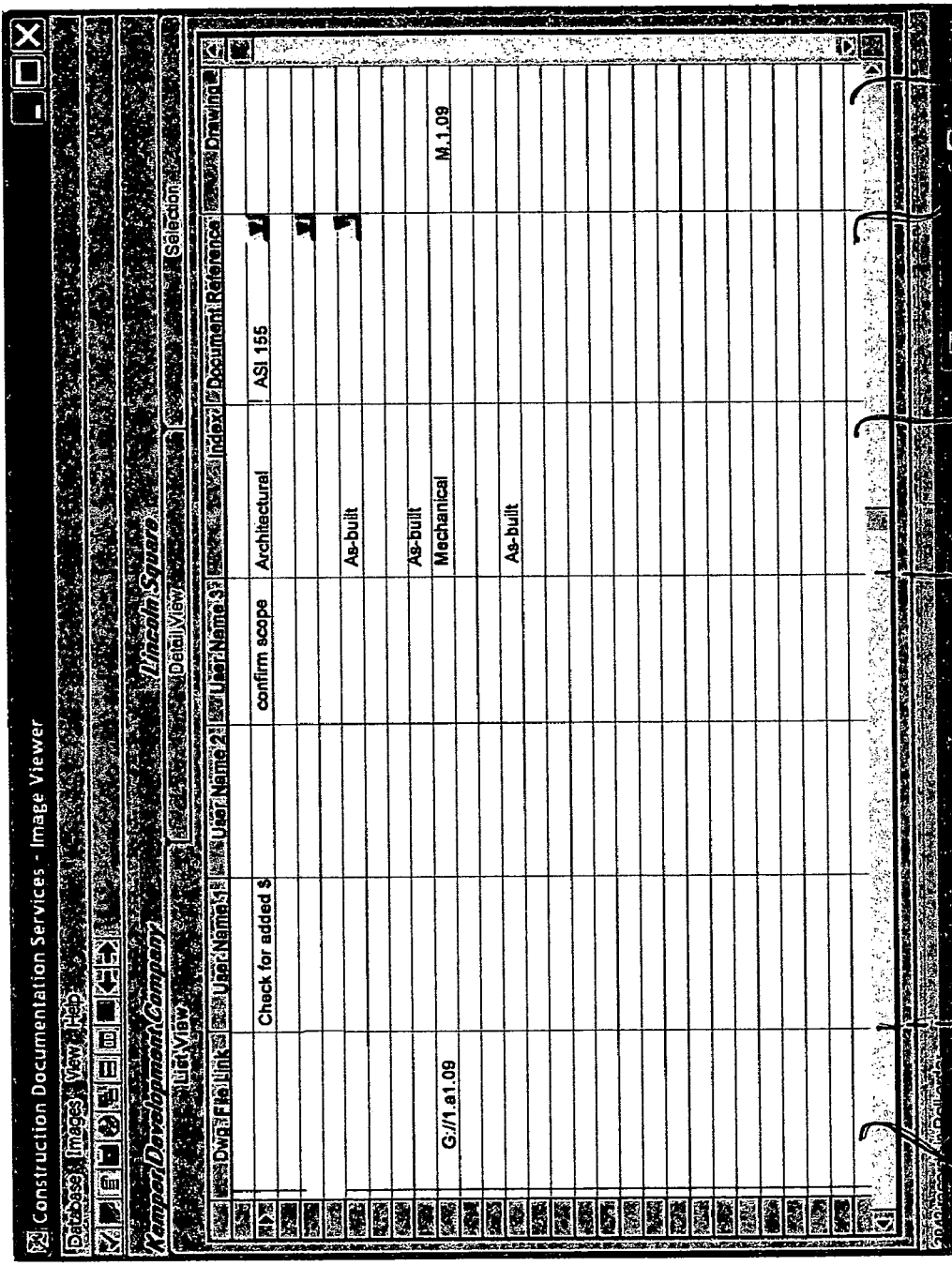

FIGS. 7A-7C are example screen displays of a list view of an example Directed Documentation System data viewer. In FIGS. 7A-7C, screen display 700 is shown with the tab 701 for list view selected. List view can be used to easily select multiple items for treating as a group. In the current display 700, a single item 702 is shown as selected. An example set of columns is displayed in FIGS. 7A-7C. Some of these contain field values that are constrained by the DDS construction data organization process and the data acquisition process to include the common and project-specific terminology selected typically in the beginning of the project. For example, the values of the locations fields 703 and 704, the level field 705, and the orientation field 706 are constrained to use uniform terminology. These constraints help insure that the selective retrievability of documentation data will operate as expected. The comments field 707 preferably also contains as much of the uniform terminology as possible. The shoot 708, image 709, media label 710 and CD image 711 columns create other indices for retrieving and/or identifying an image, and follow a DDS and/or project-specific conventions. The aerial picture 712 column allows identification of other photos, for example "plan" images taken remotely, that are also associated with the current construction project. The drawing file link 713 provides a way to associate a drawing file, for example a pdf drawing, with some image. The user name fields 714 provide some means for authorized persons to provide comments regarding the images. In some embodiments, the DDS automatically detects and authorizes particular users and tracks user comments with a user id for the image as long as the image exists. In this manner user annotations can be associated with individuals (e.g., subcontractors) which may assist in the resolution of construction issues. The index field 715 is used to assign an image to one or more classifications, which can also assist in conflict resolution, data retrieval, etc. As shown, an image can be assigned to one of the conventional construction disciplines, such as electrical, mechanical, plumbing, or structural, and/or can be assigned as relevant to producing "as-built" documentation. This field may be extended to use CSI codes as well, and is useful for quickly retrieving, sorting, and/or otherwise manipulating images. As mentioned earlier, Appendix C contains a list of example CSI codes. The document reference field 716 provides a reference link to something (e.g., a group "tag") that relates one or more images. For example, a change order may be a common source for a set of documentation images. Also, users may be permitted to assign user defined group tags to images. Drawing field 717 is a reference link to a location on a construction drawing that is typically part of the contract data. It can be another useful way to select images for retrieval.

Figure 8A:
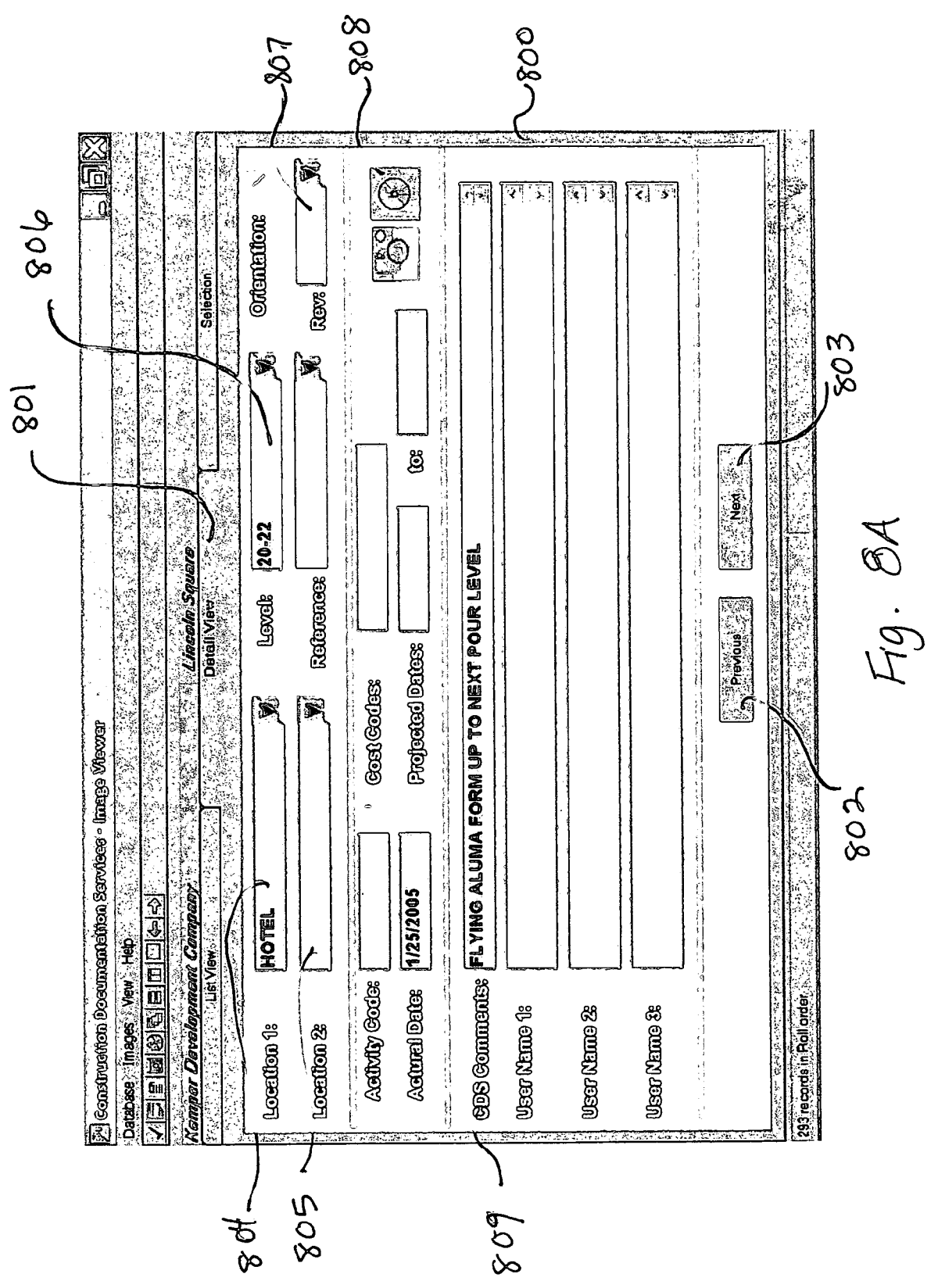
Figure 8B:
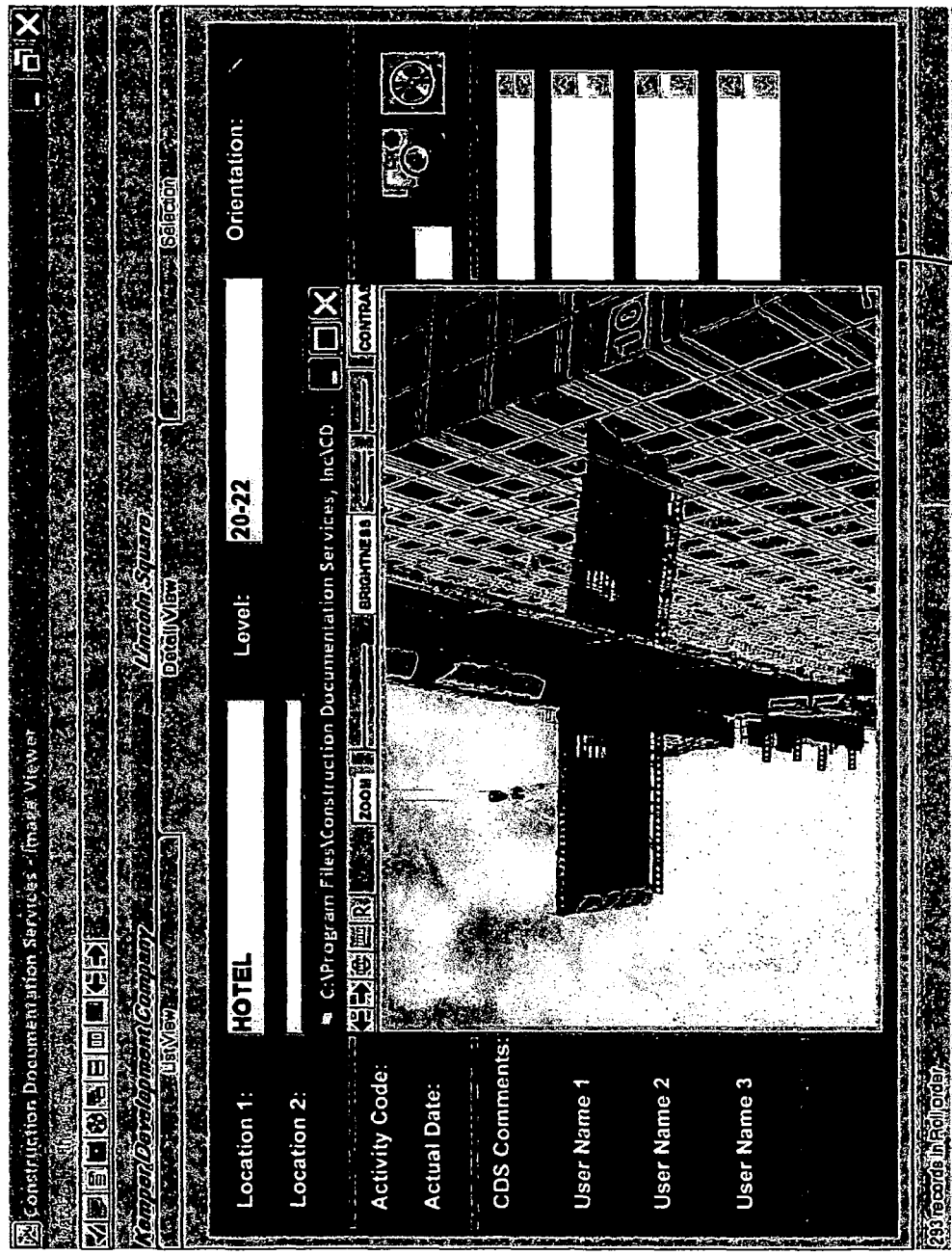

FIGS. 8A-8B are example screen displays of a detail view of an example Directed Documentation System data viewer. Detail view provides details of the DDS documentation records associated with documentation data (images and text) for a set of items that have been selected (for example using selection view to find items by specifying search criteria). It also provides a way to access the actual image associated with a DDS documentation data record. More specifically, display screen 800 is shown with the detail view tag 801 selected to initiate detail view. A user can advance and go back to other images in the selected item set using the previous and next buttons 802 and 803, respectively. The image associated with the detail record can be displayed by selection of the CD icon 808.

FIG. 8B is an example of an image associated with the DDS documentation data record shown in FIG. 8A. Image 810 is displayed by default on top of the data record and can be enhanced or further manipulated from there. Note that any changes to the image will be saved as a new revision, in order to preserve the integrity of the documentation process for things such as litigation and claims resolution.

FIG. 8A, illustrates some of the accessible data fields in the data record associated with the currently selected item. In this case, the image shown in FIG. 8B is from a hotel (as indicated by location 1 field 804) on floors 20-22 (as indicated by "level" field 806). The comments shown in CDS comments field 809 are comments input by the data capturer or during the documentation data input verification process.

Note that several of the location and orientation fields, namely the location fields 804-805, the level field contain dropdown indicators as part of the field. (The reference field and revision field 807 dropdown indicators are for different purposes.) These dropdown indicators are used to provide ways to explore related images, known in the DDS as intelligent (or active) links. The idea is that when a user is perusing an image of a particular aspect of the construction, the user may wish to see what is adjacent to the area the user is viewing, or what other images may be related based upon aspects of the construction project that encompass what the user is viewing. For example, if the user is observing a leak in the plumbing structure as shown by water stains in a photo on a wall in a room, the user may wish to view the plumbing structures on the other side of the wall, in other adjacent rooms, in the ceiling, behind the wall, etc. Intelligent links provide access to other ways of accessing images by proximity and enclosure rather than by specific selection criteria as one might enter in a search if the user knows what he or she is looking for. Hence data exploration activities are enhanced.

Although not shown, when a user selects the dropdown indicator of an intelligent link, the DDS data viewer will drop down a list of related location specifications. The user is then able to select a value from the dropdown list to retrieve associated and potentially surrounding images. Then, when a user selects an item from this list, the related images are displayed. The list may provide alternative designators to the ones the user is seeing as a value in the field. For example, if the value of the location 2 field 805 is typically a room number, then the drop down associated with the location 2 field 805 may contain grid line numbers from the construction drawings, a drawing reference range, level numbers, etc.

Figure 9:
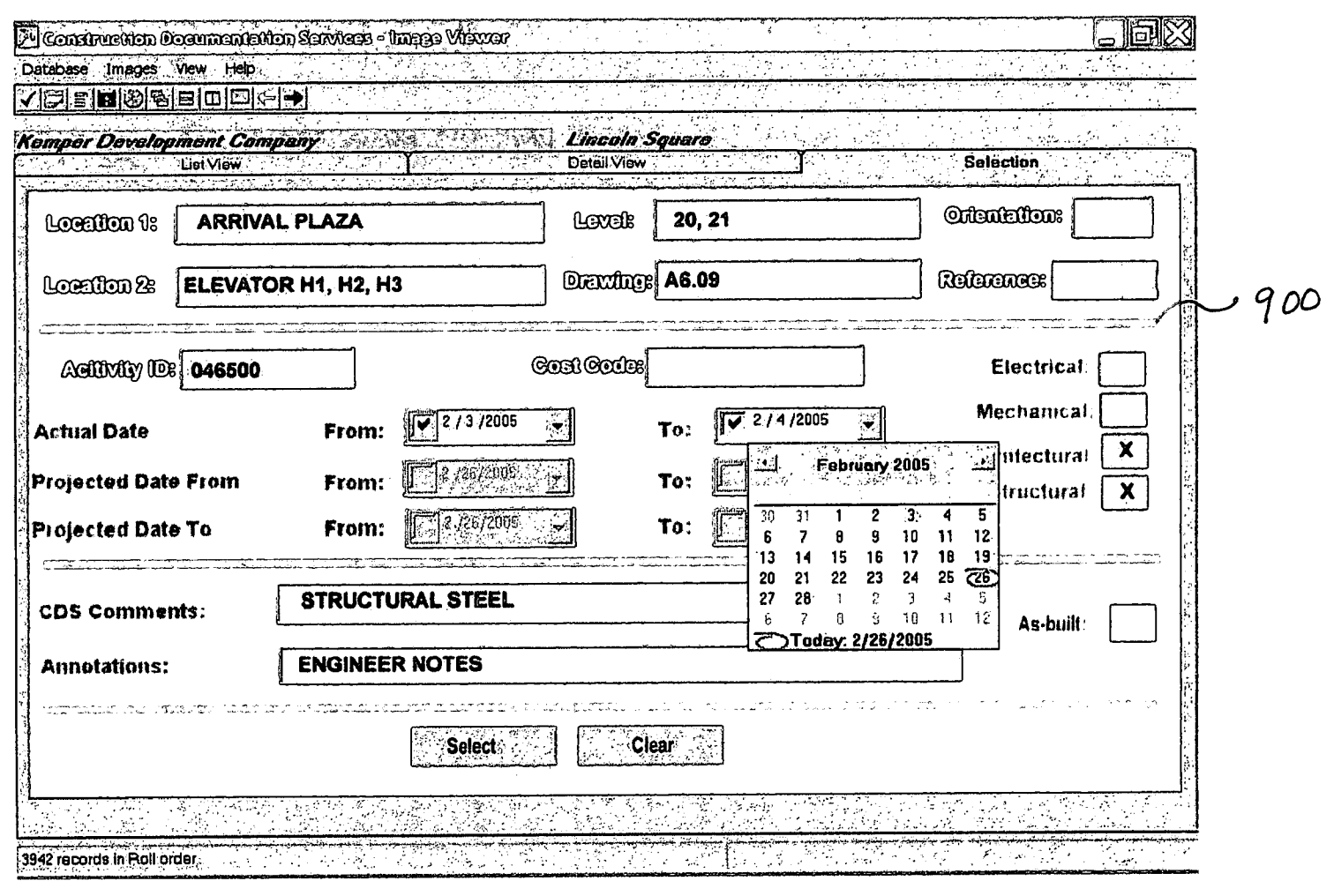

FIG. 9 is an example screen display of a selection view of an example Directed Documentation System data viewer. Selection view provides a way to specify a set of items (documentation data records) to for viewing in detail view. It provides a searching capability based upon values entered in search criteria fields. More specifically, display screen 900 is shown with the selection view tag 901 selected to initiate selection view. In one embodiment, a user may enter search criteria values by typing text into the fields having variable values or by clicking on the white labels for a drop down menu displaying all of the data values for that field. Other fields may be selected as search criteria by marking them appropriately (turning them on/off). The fields that are available as search criteria are typically defined at the beginning of the project (e.g., during the directed construction data organization process).

A user can search a project by specifying all fields individually or in combination with other fields. Typically, the most recent selection parameters are remembered (during the current user session). The search criteria currently displayed in FIG. 9 indicate that a search is to be performed for all documentation data records having the values specified in the location 2, location 2, level, drawing, and activity id fields, from Feb. 3, 2005 to Feb. 4, 2005 and having images that relate to architectural and structural aspects, and with the comments and annotations fields as indicated. Other fields and values, which are not shown, can be similarly incorporated. For example, environmental conditions such as temperature and humidity can also be specified as search criteria. Also, wildcards may be used to specify values.

In one embodiment, the list view as shown in FIGS. 7A-7C preferably displays only those data records that match the current search criteria. In other embodiments, the views operate more independently. In that embodiment, the results of the search (the set of items selected) are visible in both list view and detail view.

Figure 10:
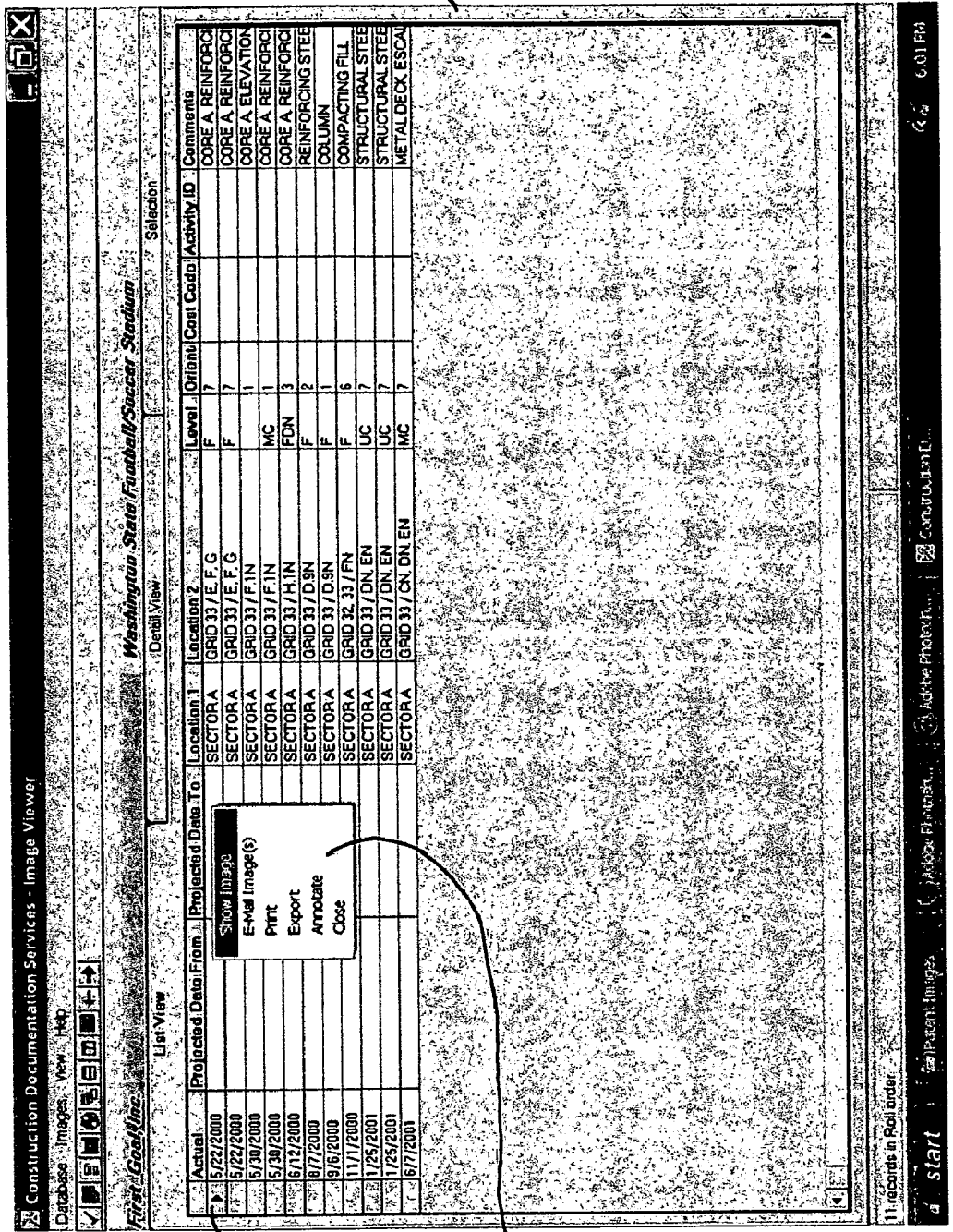
FIG. 10 is an example screen display of a technique for invoking image view on one or more images selected in list view.

FIG. 10 is an example screen display of a technique for invoking image view on one or more images selected in list view. When in list view (as shown in FIGS. 7A-7C), a set of items is selected (is active). When a user indicates, for example by right-clicking a button on an input device, the menu 1001 is displayed in display screen 1000. The menu is applicable to the active items. In FIG. 10, only one item can be seen as active (item 1002), although others may be indicated elsewhere in portions of the list that cannot currently be seen. As mentioned, the CD icon from detail view can also be used to display images for active items.

Figure 11:
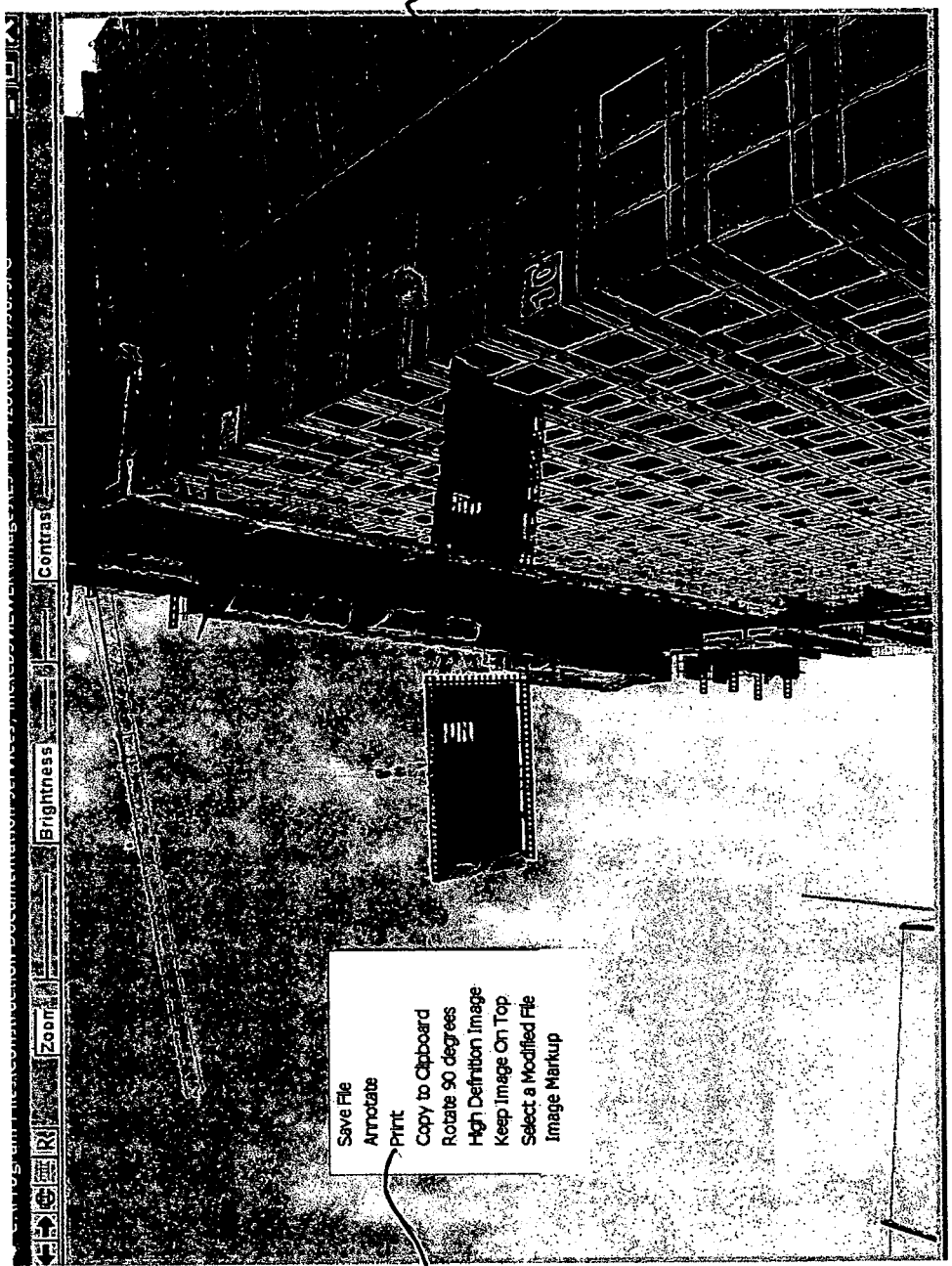
FIG. 11 is an example screen display of an image displayed in response receiving a "show image" command along with the commands available to manipulate the image.

FIG. 11 is an example screen display of an image displayed in response receiving a "show image" command along with the commands available to manipulate the image. Once an image is displayed such as that shown in image 1100, for example, using the techniques described with respect to FIG. 10, a menu 1101 is available of commands that can be used to enhance the image, distribute it, mark it up, print it, etc. In one embodiment, the menu is displayed in response to a user indication such as by right-clicking a button on an input device.

Figure 12:
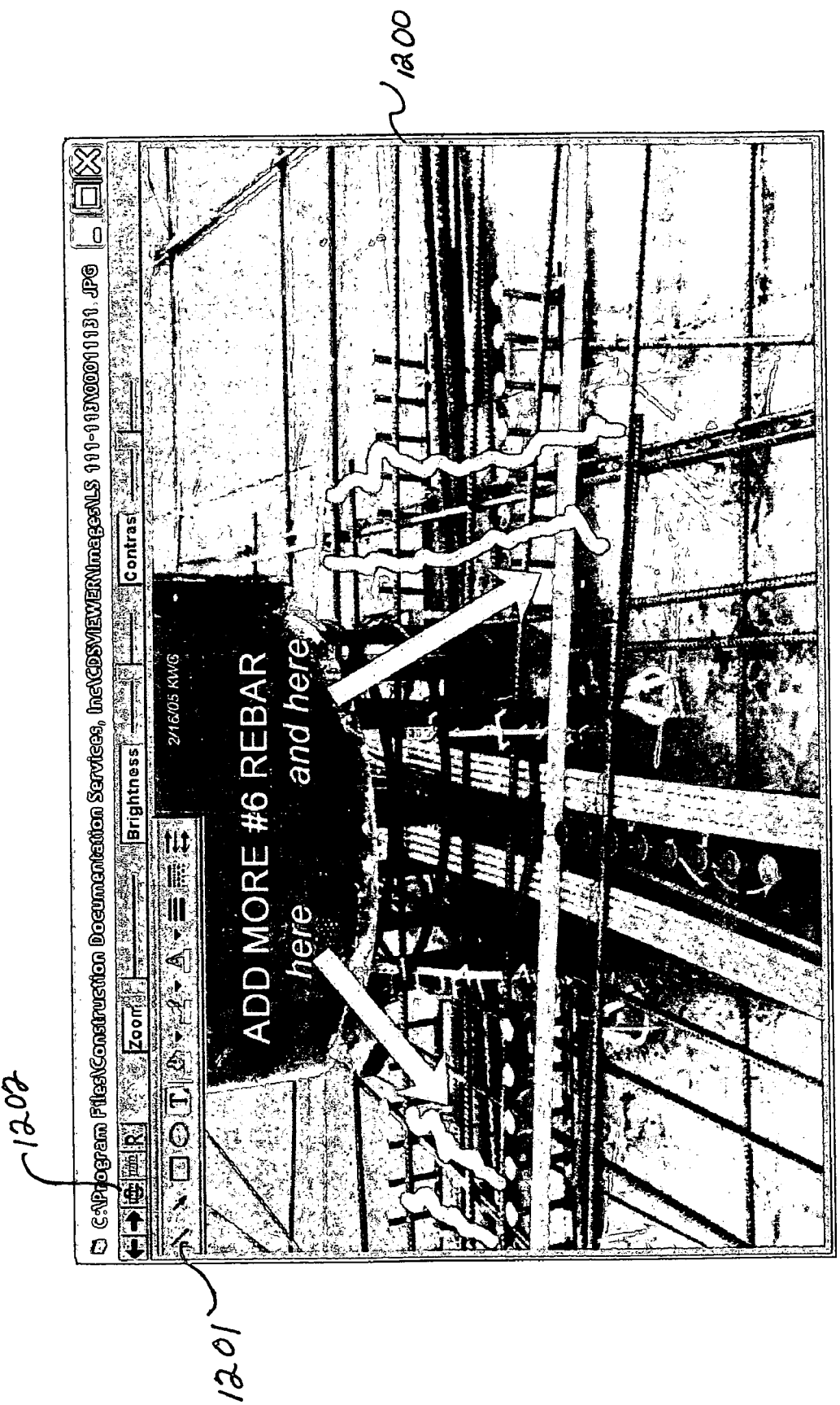
FIG. 12 is an example screen display of using the Directed Documentation System to communicate suggestions to other personnel working on the construction project.

FIG. 12 is an example screen display of using the Directed Documentation System to communicate suggestions to other personnel working on the construction project using the mark-up capabilities. In FIG. 12, image 1200 is displayed and a markup toolbar 1201 is presented in response to user selection of "Image Markup" in menu 1101 shown in FIG. 11. Note again, that when images are annotated, enhance, or marked up, they are preferably save as new revisions to preserve the integrity of the original data.

One of the inherent capabilities of the DDS data viewer when a user selects a set of DDS data records through, for example, list view or selection view, is the ability to view multiple images simultaneously. This permits the user to perform side by side analysis of multiple images which can be valuable to show the history of a particular aspect of the construction, to compare construction methods, analyze problems by viewing something from multiple directions at the same time, etc.

Figure 13A:
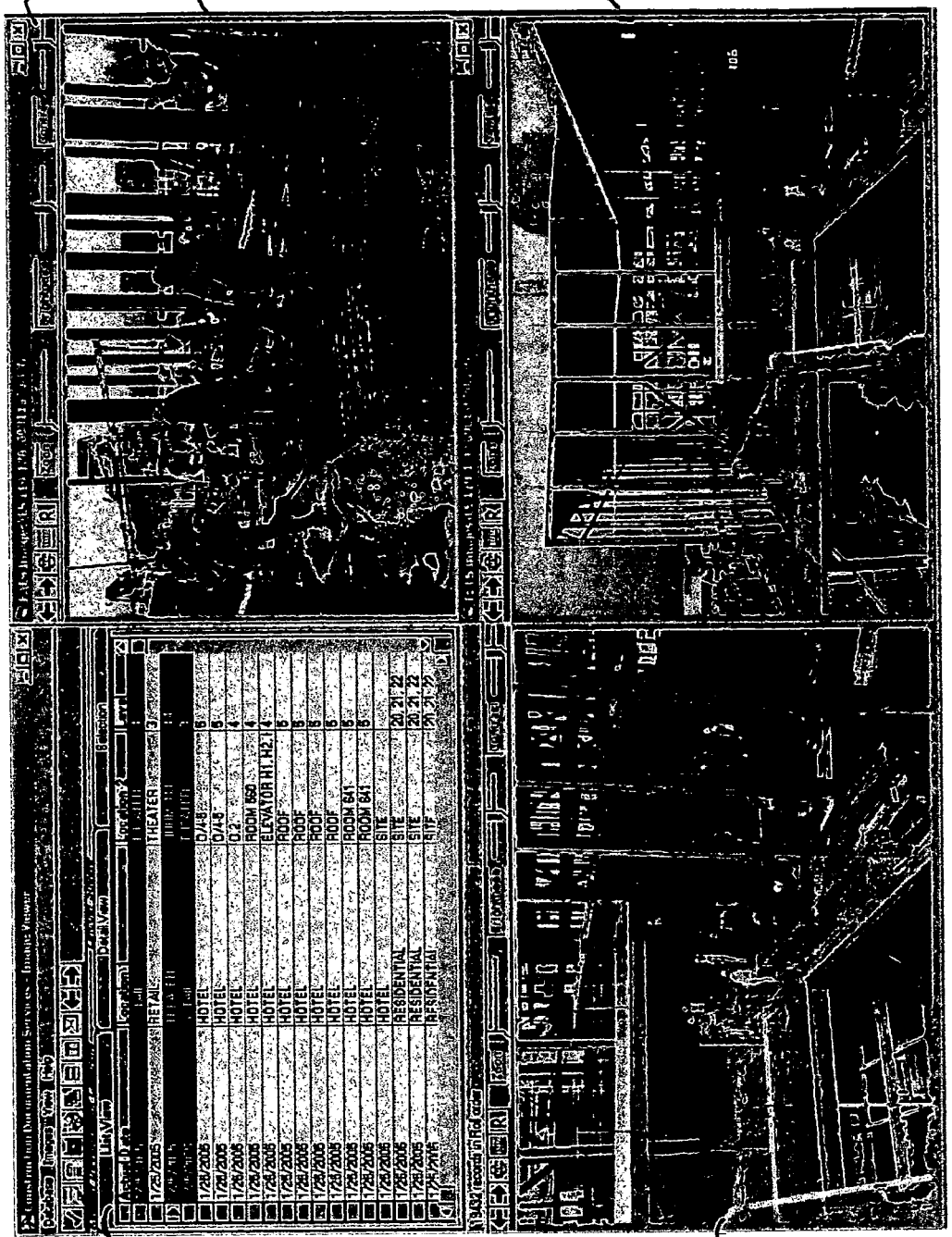
FIGS. 13A-13B are example screen displays of the multiple image presentation capabilities of an example Directed Documentation System data viewer.
Figure 13B:
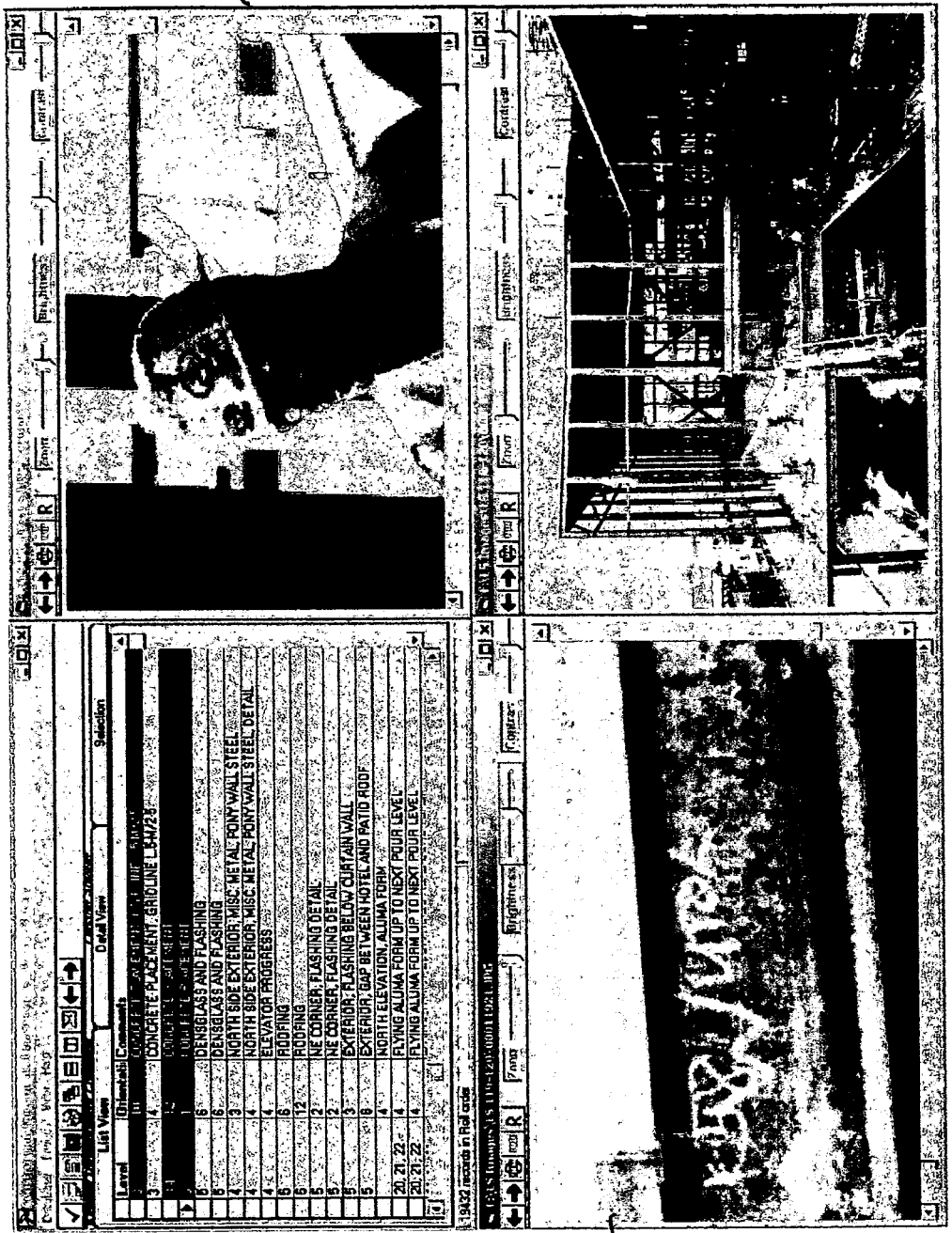

FIGS. 13A-13B are example screen displays of the multiple image presentation capabilities of an example Directed Documentation System data viewer. In FIG. 13A, display screen 1300 shows a set of tiled windows. Note that the windows used to view multiple images may be tiled or cascaded or arranged according to some other scheme. Window 1301 is a smaller view of the DDS data viewer, where the three images shown in the other windows 1302-1304 can be seen as currently selected as active records. As shown, windows 1302-1304 show three different views of a single location. All of the image manipulation features available on a single image are available on the images shown in windows 1302-1304 as well. FIG. 13B shows the same images in windows 1302-1304 but with a zoom feature applied to windows 1302 and 1303. Note that material codes and personnel can be identified in the zoomed versions of the images shown in windows 1302 and 1303.

One of the image operations available from an example DDS data viewer is semi-automated object measurement. This feature is particularly useful for assessing the type and placement of materials, which is critical for claims negotiations, permit compliance, insurance verification, quality assurance programs, etc. The ability to verify the exact placement of materials can lead to reduced insurance costs and quick settlements in the event of a claim for poor workmanship. Whether the structure was or was not built to contract standards can be proven without destructive testing of completed buildings.

One embodiment of the DDS data viewer provides a quick measuring tool and a calculated measuring tool. To measure, a user selects a measuring calibration icon (see third icon 1202 in the menu bar of the display screen 1200 in FIG. 12) and a drop down list of the tools is displayed. The user can then select between the two options as needed. The quick measuring tool is used for quick or approximate measuring when an object having a known dimension (for example, a construction element such as a stud, piling, piece of rebar) is visible in the same approximate (vertical) plane as an object (construction element) to be measured. The calculated measuring tool is used to measure objects within a user defined plane and calculates values adjusted for perspective.

Figure 14B:
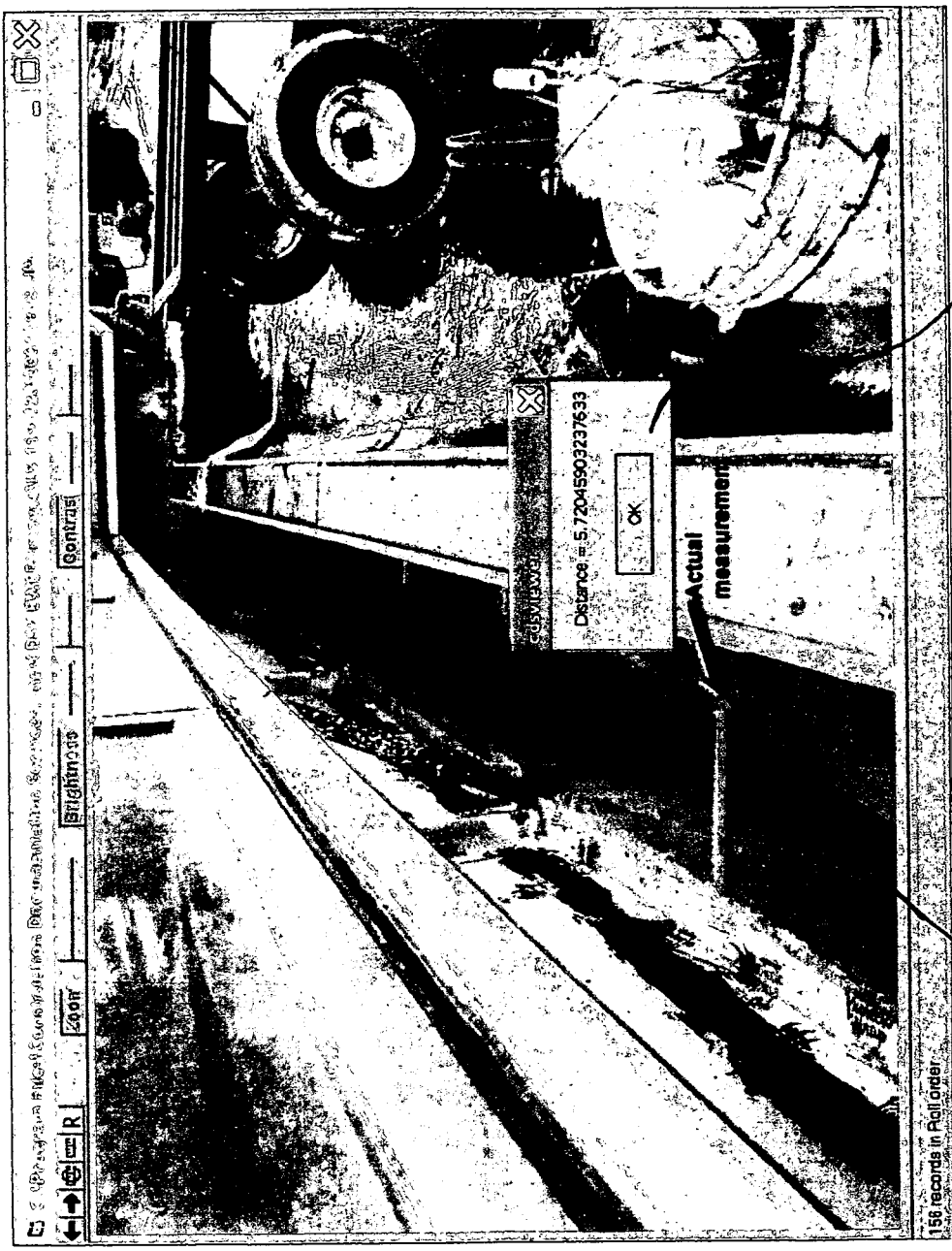

FIGS. 14A-14B are example screen displays of an electronic quick measurement tool that can be used to obtain measurements of construction elements that appear in approximately the same vertical plane as an element with a known measurement. In FIG. 14A, the user has selected the quick measurement calibration tool to facilitate an image measurement. The user already knows a dimension (measurement) of construction element 1402 displayed in screen display 1400, and enters this measurement in dialog 1401. This element then is designated a "calibration object." From the dimension of this calibration object, additional elements can be measured anywhere along a horizontal vector that emanates from the calibration object within approximately the same vertical plane as the calibration object. (Note that "vertical plane" does not imply a requirement of a perpendicular plane that intersects a horizontal plane. The vertical plane is based upon the depicted image.) FIG. 14B shows a user drawn line 1403 corresponding to an element that the user wishes to measure (here the clearance between two buildings). The DDS responds with the corresponding measurement in display 1404. Note that the element 1403 (the "line") to be measured occurs in the same vertical plane (approximately) as the calibration object (line 1402). To increase accuracy with respect to similar planes, a user can project a guide line (not shown) which displays across the visible image along the path of the calibration object. In one embodiment, the guide line shows the calibration object in a contrasting color.

FIGS. 15A-15I is an example screen display sequence of using an electronic calculated measurement tool to measure elements that appear within a user defined plane adjusted for perspective. The calculated measurement tool allows items such as waterlines to be located from a landmark and measured within a structure after they have been buried in concrete or behind a wall.

Figure 15A:
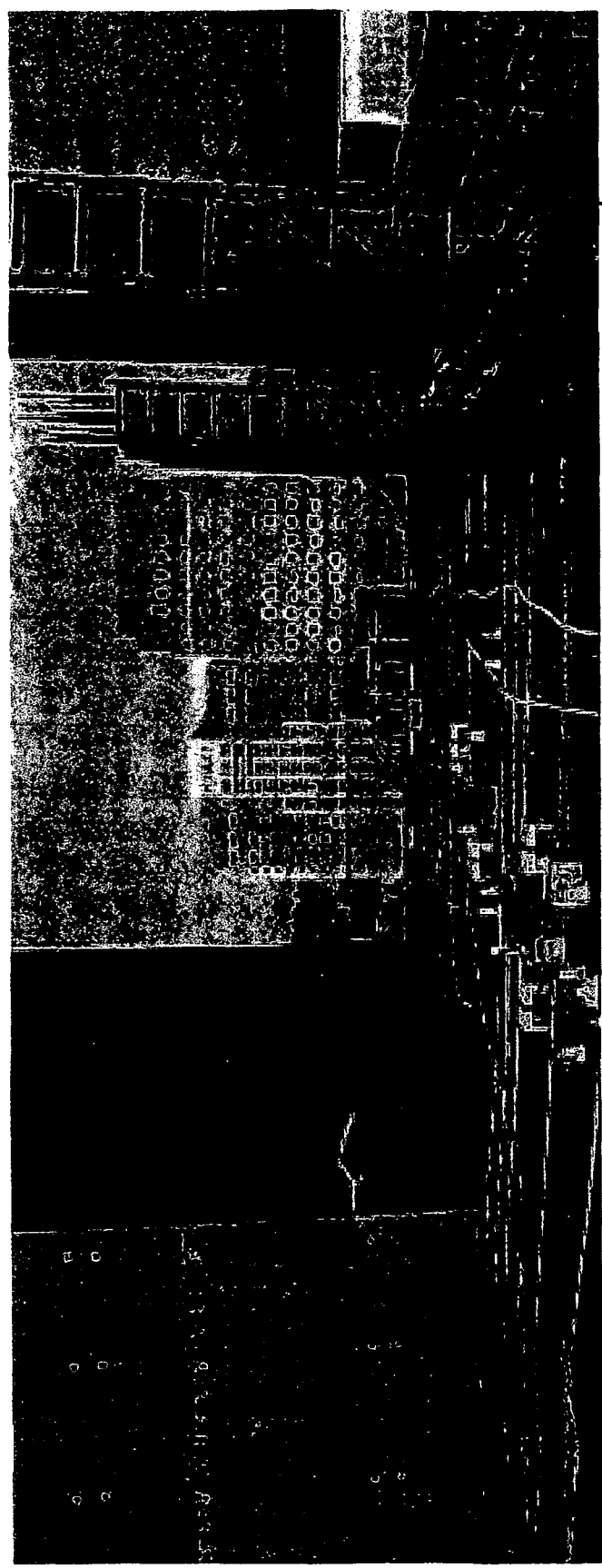
FIGS. 15A-15I is an example screen display sequence of using an electronic calculated measurement tool to measure elements that appear within a user defined plane adjusted for perspective.
Figure 15B:
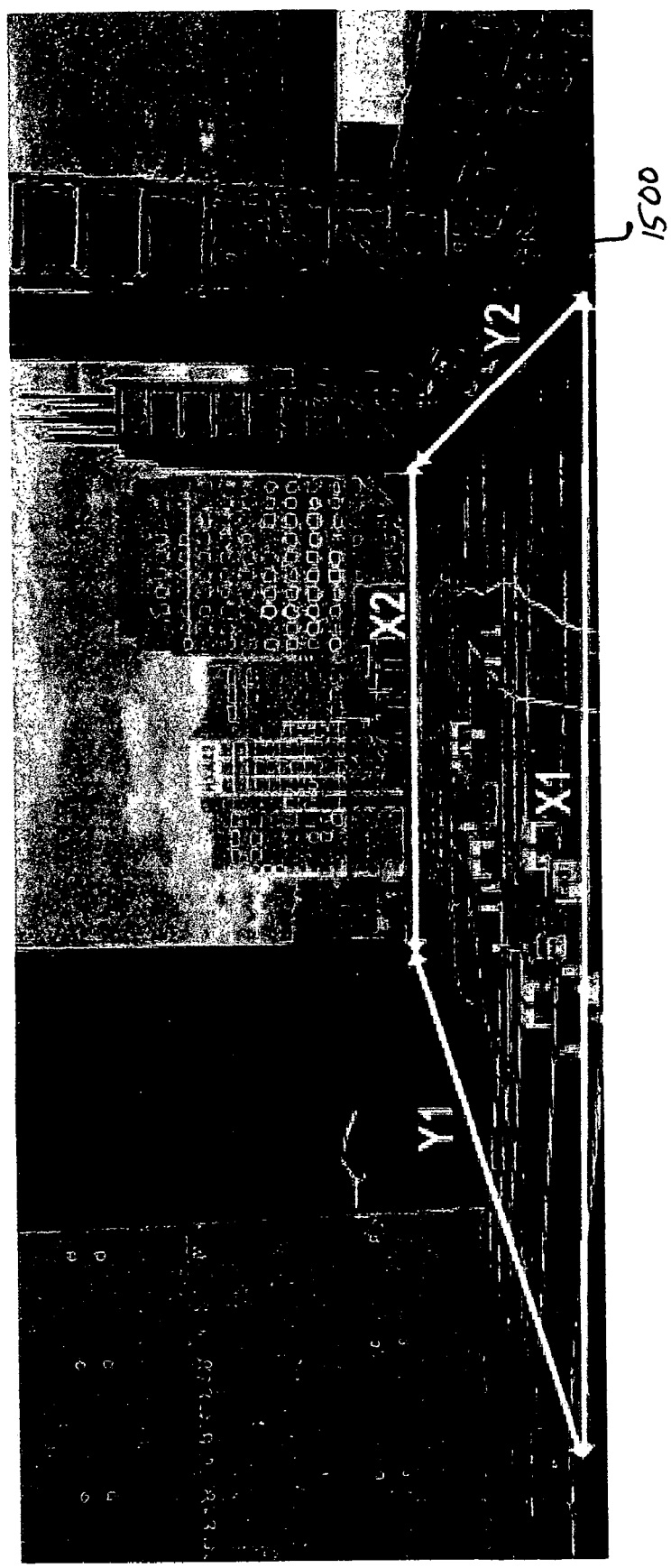

FIG. 15A shows in image 1500 construction structures (pipes etc.) located on a level of a building prior to being covered up. FIG. 15B shows the same structures, and lines that a user has drawn to indicate a user defined plane. Note that the plane defines a perspective view of the structures shown in image 1500. Lines X1, X2, Y1, and Y2 define a perspective plane for the calculated measurement tool. To be able to have the DDS data view calculated measurements of arbitrary elements within the user defined plane, the user needs to indicate known measurements of lines X1, X2, Y1, and Y2 defining that plane.

Figure 15C:
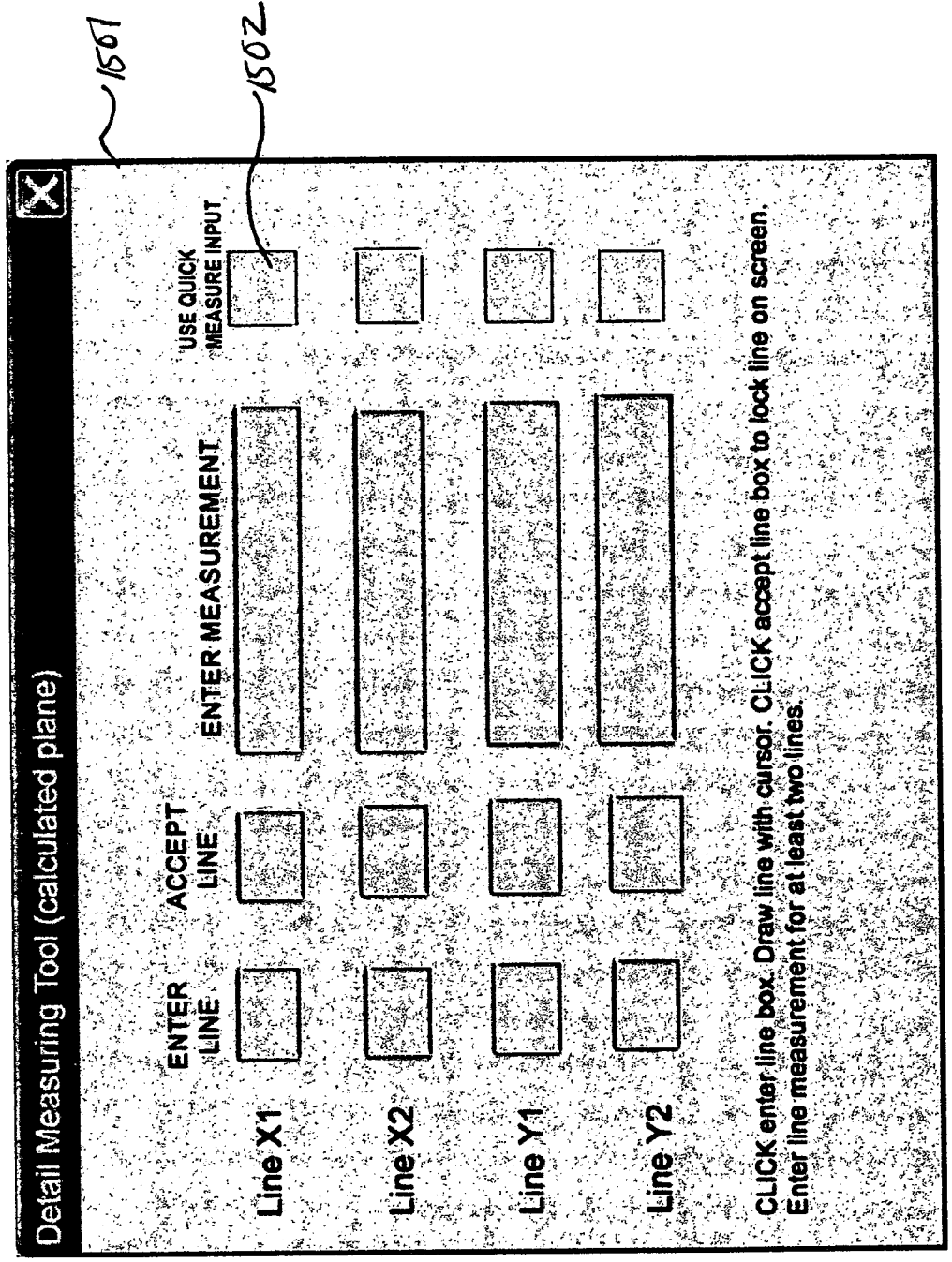
Figure 15D:
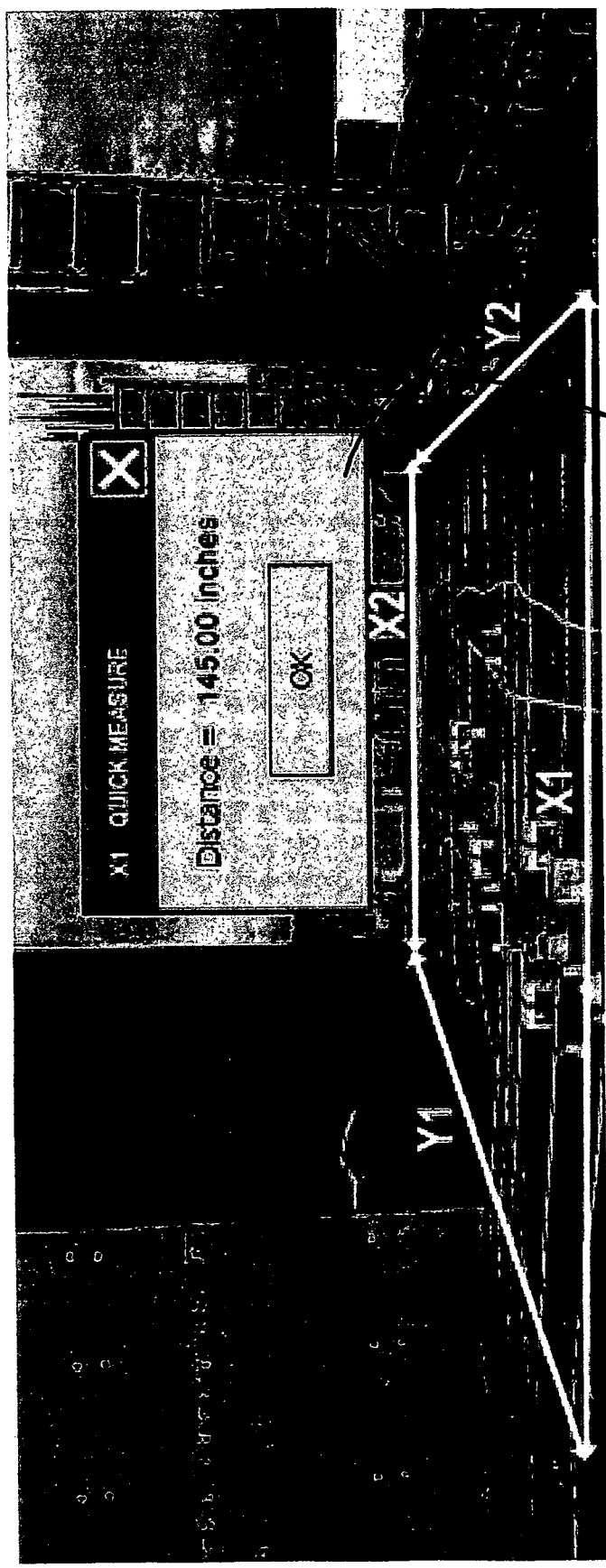

FIG. 15C shows a dialog window 1501 invoked by the user to enter the dimensions of each line that defines the user-defined plane. The user can either manually enter the dimension of each line, or can select the quick measurement tool checkboxes 1502 to indicate to the DDS that the user wishes to invoke the quick measurement tool to calculate the corresponding line. FIG. 15D is an example screen display of the user of a quick measurement tool checkbox 1502 to assist in defining the perspective plane. Display window 1503 shows the DDS calculated measurement of line X1.

Figure 15E:
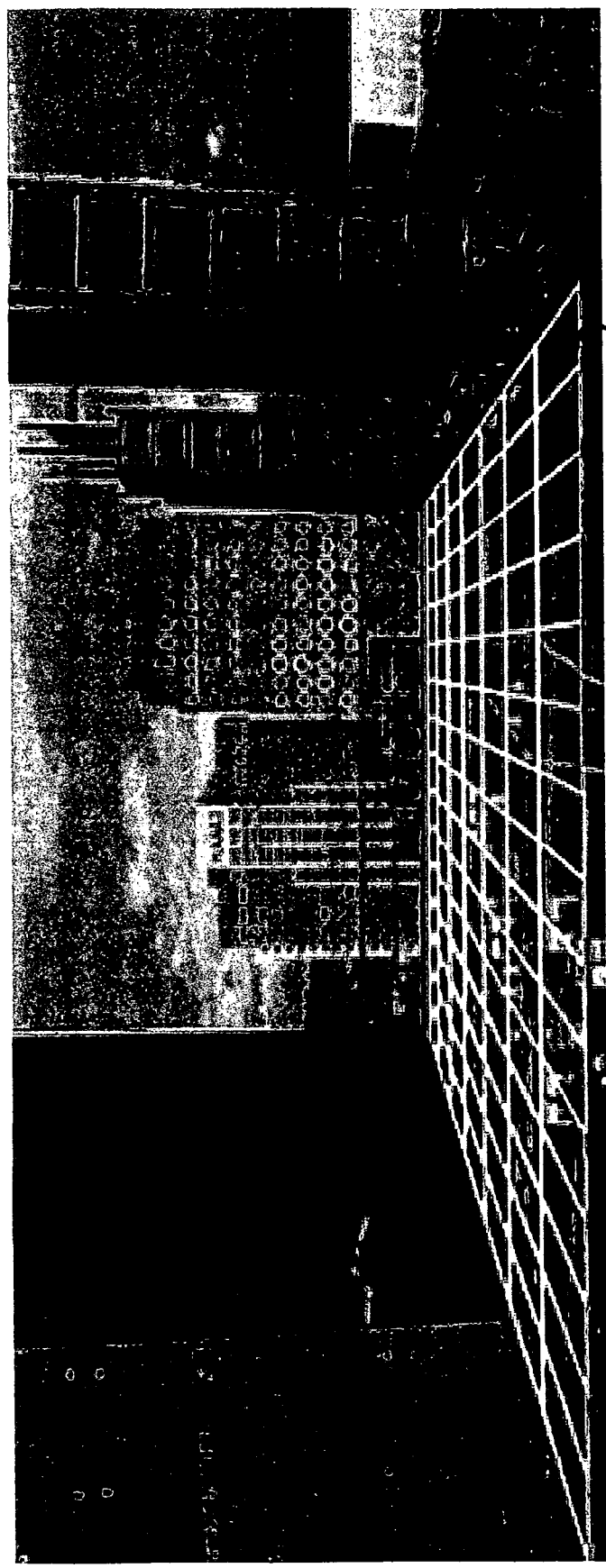

Once the user has indicated the measurements of the four lines that define the plane, then the DDS automatically calculates and draws a perspective grid to assist the user in indicating elements for which measurements are desired. FIG. 15E is an example screen display of a perspective grid 1504 overlaid on the display image 1500. Note that in some embodiments, the user is able to specify the distance between the grid lines. Also, in some embodiments, handles on the grid are supplied (not shown) so that the user can resize (shrink and stretch) the grid and the calculation algorithms are adjusted accordingly to account for the new grid size. In addition, in some embodiments a user can establish the grid in a smaller, known, area and then expand or project it to a larger area in order to take advantage of known measurements.

Figure 15F:
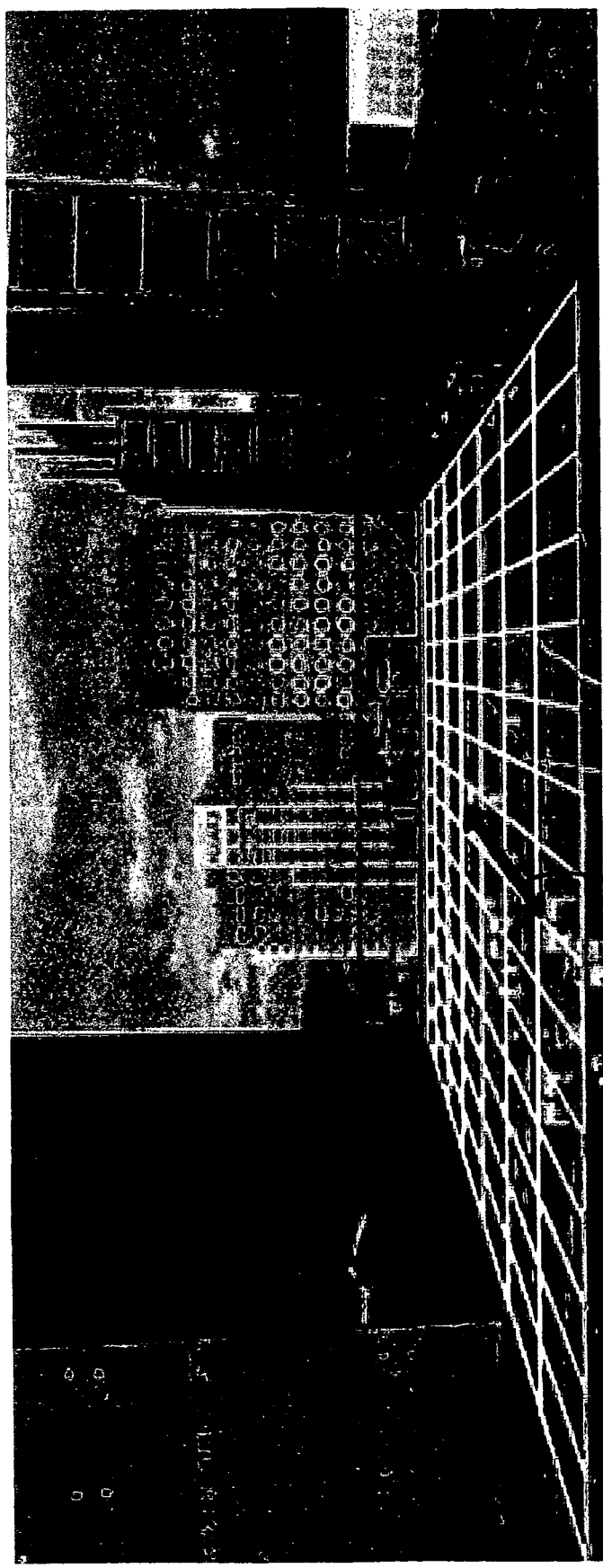
Figure 15G:
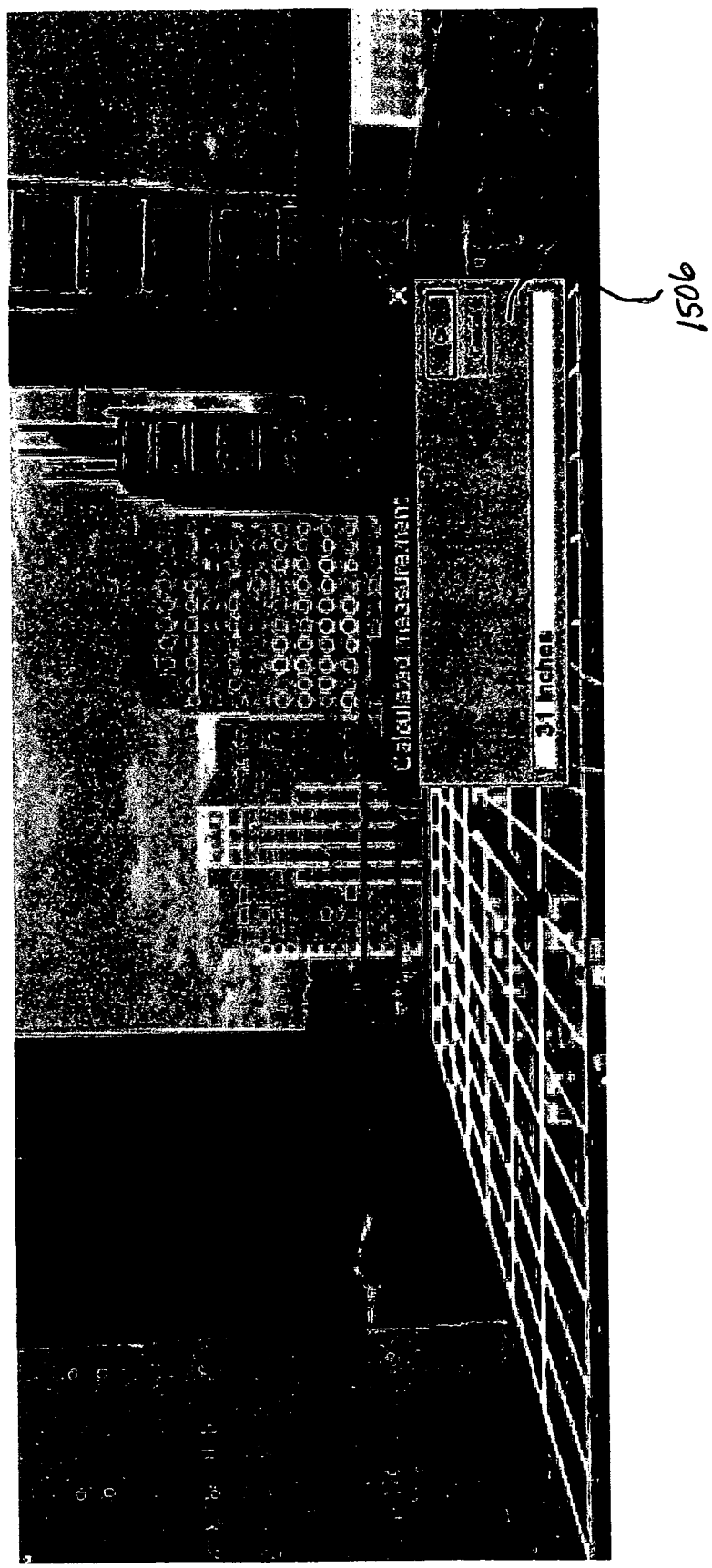

Using the perspective grid as an aid, the user can now indicate to the measurement tool an arbitrary construction element whose dimension is unknown, as long is it lies within the user defined plane. Conventional mathematical algorithms can be employed to derive the measurement as long as the element lies within the plane defined by lines X1, X2, Y1, and Y2. FIG. 15F is an example screen display of a line 1505 drawn by a user to estimate the distance between two objects shown in the image 1500. FIG. 15G shows the system calculated measurement returned in window 1506.

Figure 15H:
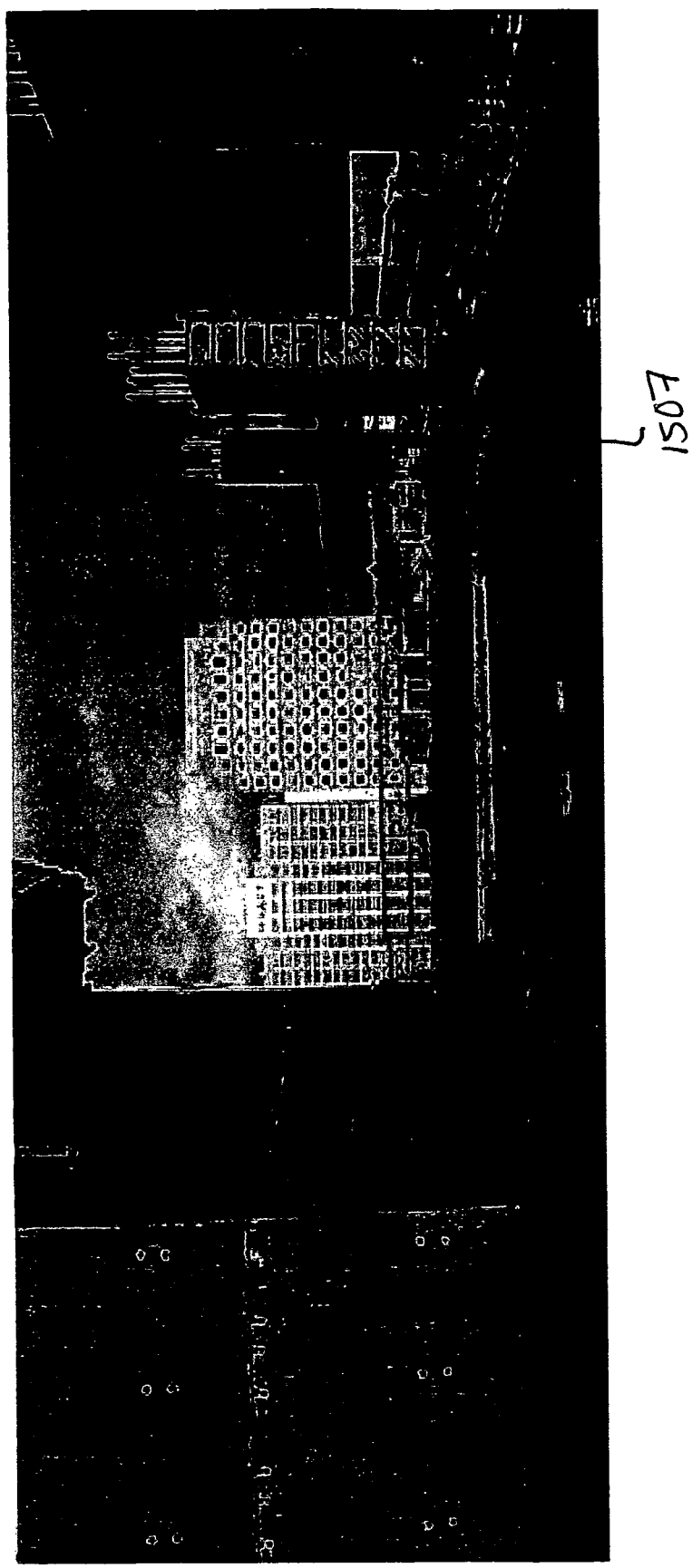
Figure 15I:
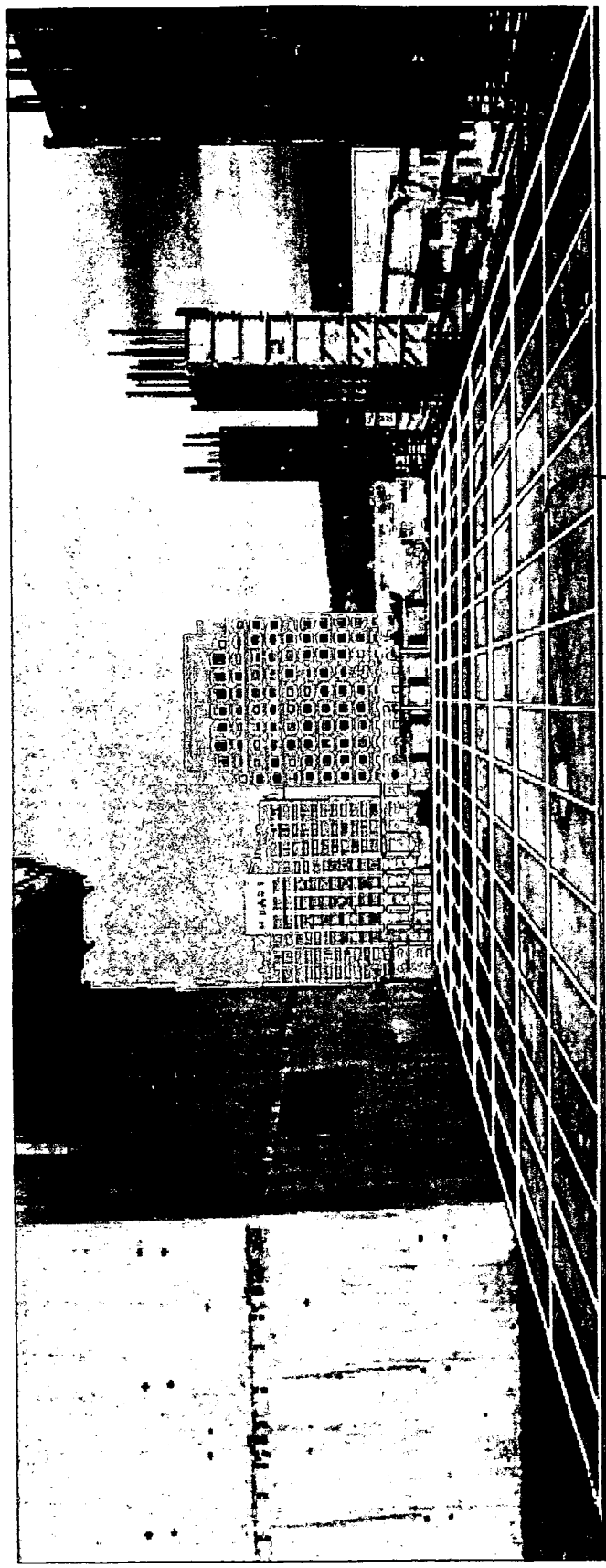

Once a perspective plane has been defined by the user, in some embodiments it is preferably stored by the system so that it is associated with the structures depicted by the image for future use. (Since it will be invoked on newly captured images, the plane needs to be associated with landmarks in the imagery depicted by the image, so that, as long as the new image contains the landmark, the perspective grid can be used. Alternatively, if the image is captured in the same way approximately as before, the grid can be reused as is.) This is a particularly beneficial feature for measuring additional elements of the depicted structure even after the depicted structures have been covered up. For example, FIG. 15H is displaying an image 1507 that depicts the same construction level after concrete has been poured over the previously exposed pipes etc. When the user invokes calculate measurement tool now, the DDS data viewer will recognize that there is a user-defined plane available (and retrieve the plane definition) that is associated with the elevator core (line Y1) and the building perimeter (line X2) and will utilize it to calculate again a perspective grid. FIG. 15I shows the perspective grid 1508 recalculated from a preserved user defined plane. From this the user can measure hidden objects knowing where they were located in the image before the depicted structures were covered up.

As described with respect to FIG. 1, once the DDS has uploaded documentation data in the form of images and text, documentation data can be distributed using a construction documentation data distribution process (for example, through distribution component 105 in FIG. 1), both at the request of users and by the DDS automatically. For example, using the image manipulation commands, users can explicitly invoke commands print one or more images along with other documentation data record information, such as that shown in the detail view. In addition, users can print canned reports or custom reports through the use of templates. Users can also distribute images and other parts of the documentation data records electronically, such as by forwarding such to other media, through an email system, or otherwise across a network. These capabilities support the archiving of images as well as distribution for a variety of other purposes.

In addition to the distribution available to users, the DDS can itself issue reports on a periodic basis, at determined intervals, at determined events, times, or calendar units, or in response to a documentation event, which, when triggered, causes the system to distribute an appropriate report. As used herein, the term "report" refers to any electronic or hardcopy compilation of the images, images and text, or other parts of the documentation data records that can be distributed electronically and/or on hardcopy.

For example, reports can be automatically triggered by a documentation event that is associated with a progress payment. Documentation that provides evidence that a payment related milestone has been met is easy to produce using the fields that are stored and can be used to index and/or retrieve documents relating to a particular milestone. For example, a structural milestone related to laying all of the rebar in a building could produce all images up to a particular date showing the rebar activity in the locations of interest. Alternatively, images can be annotated by the DDS staff to indicate that they are evidence of a verification event. Other similar techniques can be used.

Another example report that can be automatically generated by the DDS is a manpower report. Manpower reports are often used to assess and/or estimate cost. They examine how many people were used to perform a particular activity and over what time period. Since the directed documentation data acquisition instructions direct the capture of images related to people present at any construction activity, the data for such reports can be easily generated.

Also, as discussed earlier, custom reports can also be set up to be triggered by a documentation event including verification events. As part of the documentation event, the intended recipients can be registered as well as the distribution method to be used, etc. Thus, it is possible to distribute such reports fully automatically by computer systems that aid in the implementation of the DDS.

One special class of construction documentation that is considered highly desirable and difficult to generate reliably are "as built" drawings, also referred to as "as-builts." "As-built" is an industry term used to describe an architectural or engineering drawing of how a building was constructed or a system was installed. Systems as-builts are primarily for the benefit of building operators and owners after construction has been completed. Accurate as-builts are critical in maintenance, repairs and remodel or expansion projects.

In current construction projects, as-builts are typically delivered as a drawing (or CAD file) showing mechanical, electrical and plumbing assemblies installed in a building. Due to the limitations of a two dimensional drawing, these as-builts are schematic representations of the systems installed: they represent what is installed and the termination point (faucet, switch etc), but not the pathway and routings of the hidden systems. A complex method of laser measurement and photographic imagery combined and overlaid with CAD drawings exists and can be used to create relatively accurate models of existing installations. However such a system is time consuming, requires sophisticated and costly computer programs and systems, and is cost prohibitive for most uses.

As-builts are typically not generated for general construction of structure and frame, except to note change orders or contract revisions to the original drawings. The Directed Documentation System inherently generates as-builts for portions of the structure and frame as well as for the various electrical, mechanical, and plumbing systems that are constructed as a natural product of the directed documentation process that is used. These as-builts can be compiled on an ad-hoc basis or generated through reports that select documentation data records based upon factors such as completed work, "as-built" classification (see for example, see classification field in selection view shown in FIG. 9) combined with a location or construction subject of interest.

The DDS also supports the ability to direct the documentation data acquisition process in advance to support the creation of as-built documentation for various systems (and structural components). Specifically, as part of the protocols, all equipment used in mechanical drawings are instructed to be captured. Also, the DDS directed construction data organization process can explicitly preload locations of interest for as-builts into the documentation terminology output. It can also build documentation events into the documentation calendar to schedule the explicit documentation of these preloaded locations and system on an ongoing basis and with special checks to make sure documentation data is captured just prior to the systems being covered.

The DDS construction verification process also provides virtual transparency to construction processes and hidden systems—users of the DDS and/or its reports are able to access the historical data associated with an imagery location that has been documented, and whose documentation includes an image captured when the verification event is completed. This construction verification process provides the equivalent of a visual as-built record of specific building spaces. When as-built service is requested on a project receiving comprehensive documentation, the DDS processes and components will reflect that need. At the end of the project (or at other times), an as-built data file can be constructed automatically from the DDS documentation data repository.

An as-built record can also be commissioned separately and the DDS can be programmed to reflect each situation. To note, as-built images can include image enhancement features as well.

Figure 16A:
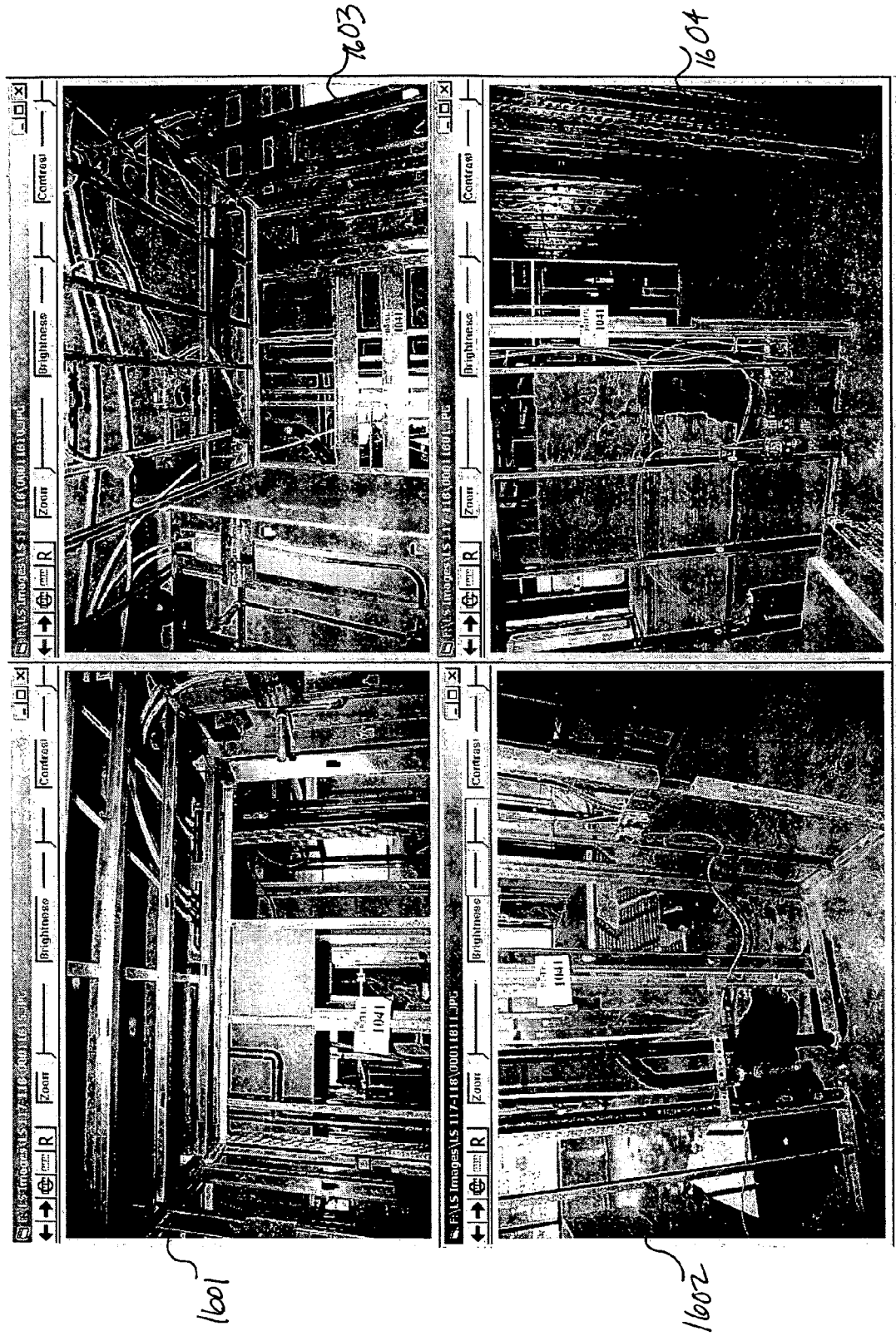
FIGS. 16A-16B are example screen displays of "as-built" documentation produced automatically as a result of a Directed Documentation System process.
Figure 16B:
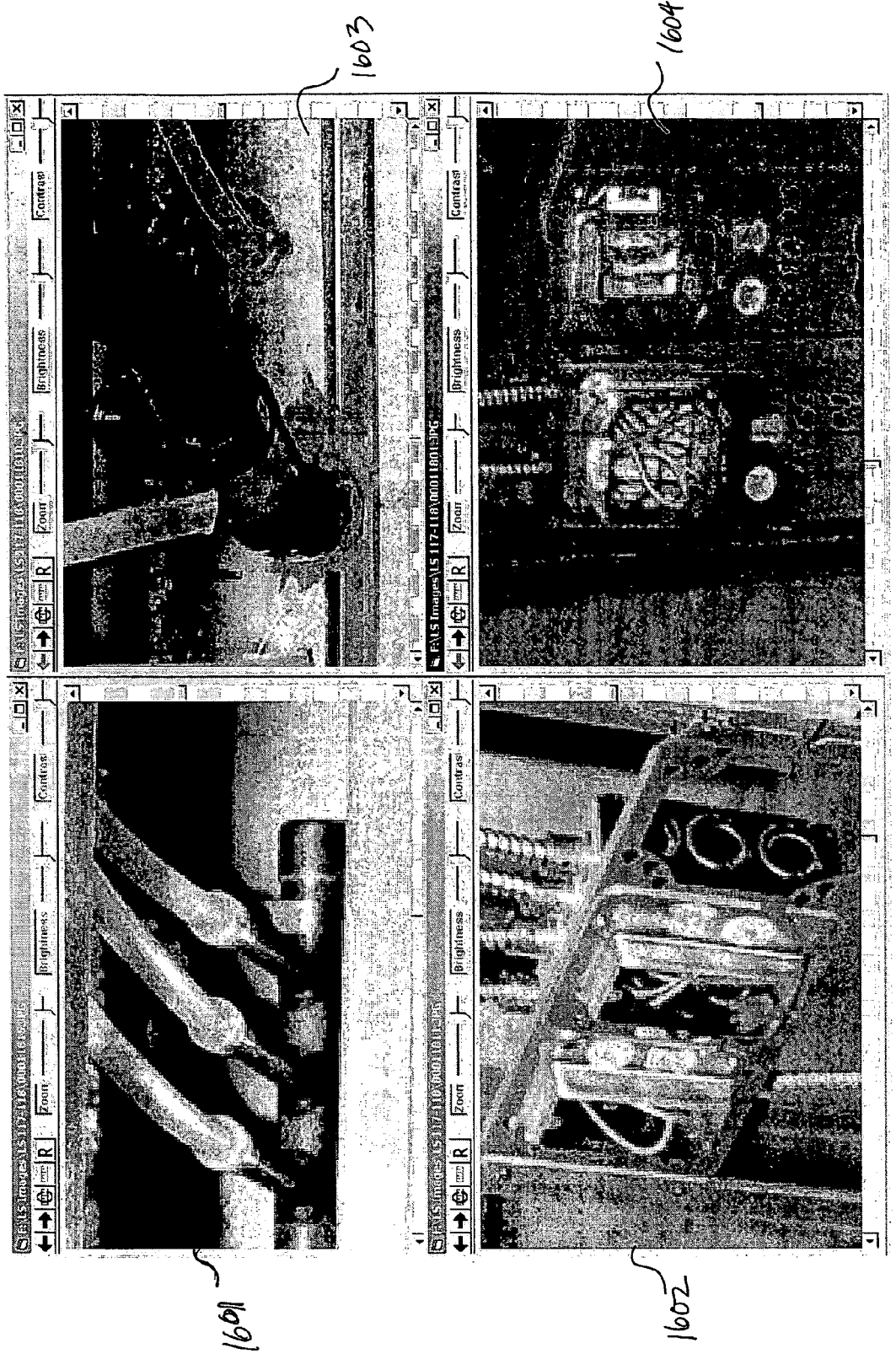

FIGS. 16A-16B are example screen displays of "as-built" documentation produced automatically as a result of a Directed Documentation System process. The display windows 1601-1604 in FIGS. 16A and 16B show the portions of plumbing and electrical systems in a facility prior to insulation and wall coverage. Both Figures show the same images; however, FIG. 16B uses the "zoom" function available to manipulate images in order to identify extreme detail. As-built documentation can be generated to also identify the room or area, wall, system and date of the as-built.

The Directed Documentation System can also produce other types of documents and reports. For example, in addition to the as-builts, the DDS can create fully indexed and annotated documents with cross referenced photographs in digital media and printed format for purposes such as precondition surveys, training, condominium construction verification, etc. Data can come from the documentation data records collected as a natural part of the directed documentation data acquisition process or from data gathered explicitly for such documents.

For example, the DDS directed data acquisition process can also guide data capturers in the documentation of existing buildings and areas adjacent to a project to establish a baseline of conditions prior to commencement of construction. Such documentation can be used to generate a precondition survey, which is typically used to demonstrate compliance with regulatory requirements of disturbed area restoration, traffic management, confirm or refute damage claims from neighboring properties, etc.

The DDS processes can also be used to generate documentation for training materials, bid information such as that based on sequence of work or specific task/equipment type, and a variety of other client-specific types of documentation.

The DDS directed documentation procedures can also be used to support condominium construction verification. There are stringent rules imposed upon condominium developers regarding disclosure, quality, etc. A separate data file can be created as part of the documentation schedule showing pertinent construction details and as-built status for each individual condominium in a development project. Each data file can be transferred to electronic hard medium (CD, DVD) and/or printed in hard copy. The DDS can be programmed to distribute individual condominium data packages to be included with other sales documents and delivered to the buyer. The DDS also can be programmed to distribute a single project record to the Developer with all data for all condominiums included. Data for condominium verification can be culled from the DDS data repository as part of the documentation process or acquired specifically for this purpose. With such documentation in hand, the developer is able to meet obligations of disclosure and achieves a measure of legal protection; the buyer receives assurance of workmanship, details of hidden construction and a record to facilitate repairs or remodels.

Also, taken collectively, the documentation projects conducted using the DDS inherently create a vast library of construction sequencing, material handling, and construction methodology that can be indexed and retrieved by authorized personnel across all documentation data records. Through the DDS, this material becomes a retrievable asset.

Figure 17:
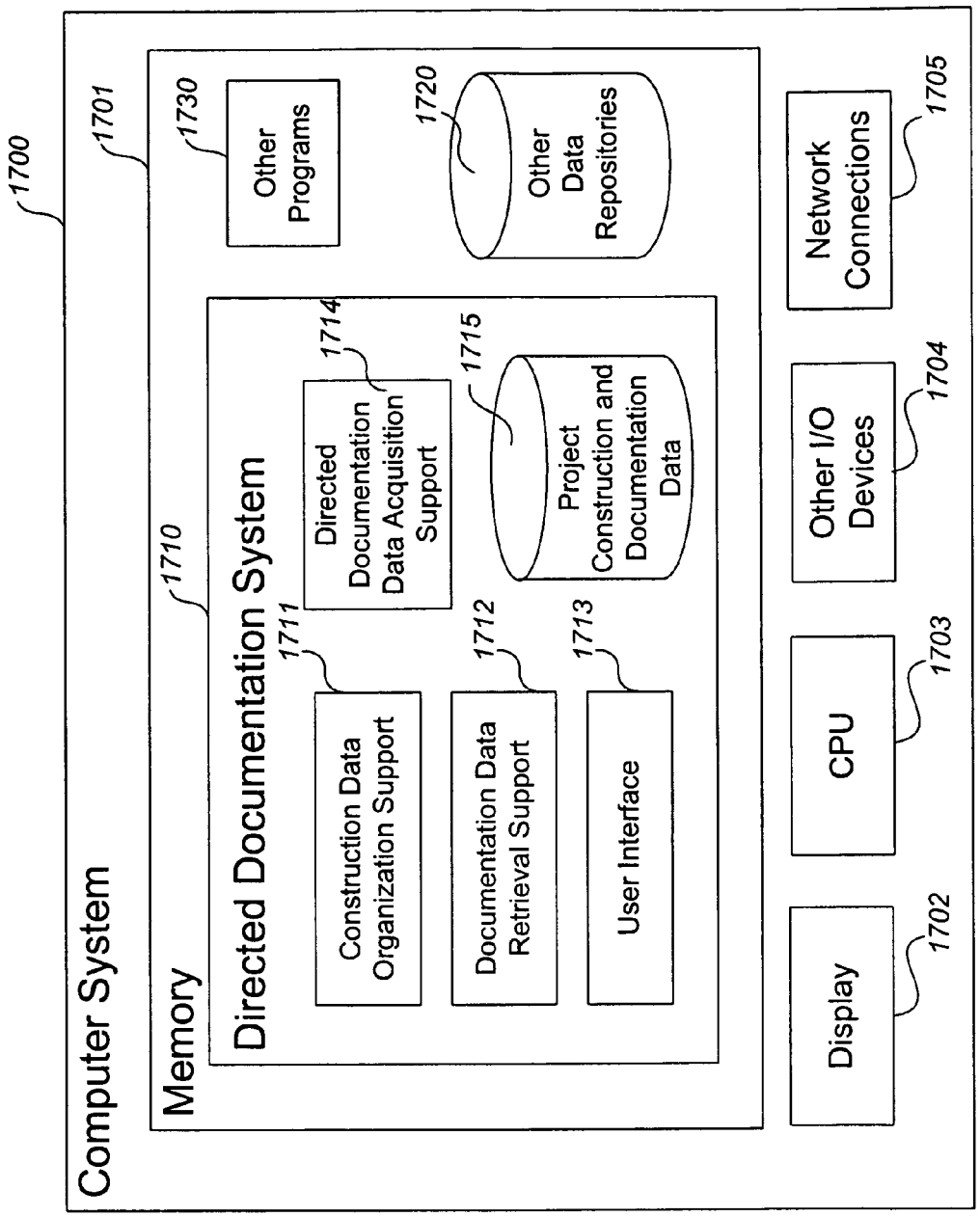
FIG. 17 is an example block diagram of a computer-assisted general purpose computer system for practicing embodiments of a Directed Documentation System.

FIG. 17 is an example block diagram of a general purpose computer system for practicing embodiments of a computer-assisted Directed Documentation System. The general purpose computer system 1700 may comprise one or more server and/or client computing systems and may span distributed locations. In addition, each block shown may represent one or more such blocks as appropriate to a specific embodiment or may be combined with other blocks. Moreover, the various blocks of the DDS 1710 may physically reside on one or more machines, which use standard interprocess communication mechanisms to communicate with each other.

In the embodiment shown, computer system 1700 comprises a computer memory ("memory") 1701, a display 1702, a Central Processing Unit ("CPU") 1703, Input/Output devices 1704, and network connections 1705. One or more of these components may not be included in any one implementation. The Directed Documentation System ("DDS") 1710 is shown residing in memory 1701. The components of the DDS 1710 preferably execute on CPU 1703 and manage the generation and use of construction documentation data, as described in previous figures. Other downloaded code 1730 and potentially other data repositories, such as data repository 1720, also reside in the memory 1710, and preferably execute on one or more CPU's 1703. In a typical embodiment, the DDS 1710 includes one or more Construction Data Organization Support modules 1711, one or more Documentation Data Acquisition Support modules 1714, one or more Documentation Data Retrieval Support modules 1712, a user interface 1713 and a project construction data and documentation data data repository 1715.

In an example embodiment, components of the DDS 1710 are implemented using standard programming techniques. The DDS components 1711-1715 may be implemented using object-oriented techniques or more monolithic programming techniques. In addition, programming interfaces to the data stored as part of the DDS process can be available by standard means such as through C, C++, C#, and Java API and through scripting languages such as XML, or through web servers supporting such. The DDS data repository 1715 is preferably implemented for scalability reasons as a database system rather than as a text file, however any method for storing such information may be used. In addition, the adjustments to be made to the contract data and/or documentation schedule may be implemented as stored procedures, or methods attached to contract data "objects" and documentation schedule "objects" although other techniques are equally effective.

The DDS 1710 may be implemented in a distributed environment that is comprised of multiple, even heterogeneous, computer systems and networks. For example, in one embodiment, the construction data organization support module 1711, the data acquisition support module 1714, and the DDS data repository 1715 are all located in physically different computer systems. In another embodiment, various components of the DDS initials 1710 are hosted each on a separate server machine and may be remotely located from the tables which are stored in the DDS data repository 1715. Different configurations and locations of programs and data are contemplated for use with techniques of described herein. In example embodiments, these components may execute concurrently and asynchronously; thus the components may communicate using well-known or proprietary message passing techniques. Equivalent synchronous embodiments are also supported by an DDS implementation. Also, other steps could be implemented for each routine, and in different orders, and in different routines, yet still achieve the functions of the DDS.

All of the above U.S. patents, U.S. patent application publications, U.S. patent applications, foreign patents, foreign patent applications and non-patent publications referred to in this specification and/or listed in the Application Data Sheet, including but not limited 11/375,543 (Express Mail No. EV447227215US), entitled "Method and System for Directed Documentation of Construction Projects," filed Mar. 13, 2006; and U.S. Provisional Patent Application No. 60/661,048, entitled "Method and System for Directed Documentation for Construction Projects," filed Mar. 11, 2005, are incorporated herein by reference, in its entirety.

From the foregoing it will be appreciated that, although specific embodiments have been described herein for purposes of illustration, various modifications may be made without deviating from the spirit and scope of the present disclosure. For example, the methods and systems for performing directed documentation of construction projects discussed herein are applicable to other types of systems and processes that could benefit from directed documentation. For example, the directed documentation techniques could be applied to plant (e.g., manufacturing plant) equipment and machinery; boat/ship building; status reports for sophisticated manufacturing plants such as steel mills, integrated circuit chip manufacturing plants, power plants, etc; status reports for environmental conditions such as post natural disaster, species/habit studies, and natural resources; and asset management control. Also, the methods and systems discussed herein are applicable to differing software and hardware architectures, application specific protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-readable memory medium containing content that, when executed, causes a computer system to assist directing of documentation of a construction project, including multi-disciplinary aspects of the construction project, by performing a method comprising:

storing in a memory of the computer system a plurality of contract document data, including data from construction drawings, construction specifications, documents indicating changes to construction, and a construction schedule for the entire construction project;

storing in the computer system memory a generated documentation schedule that takes into account the stored contract document data;

in accordance with the stored documentation schedule and the contract document data, generating and publishing data acquisition instructions for a plurality of construction activities to be documented;

electronically receiving documentation data that documents each construction activity in accordance with the data acquisition instructions as a plurality of images and text; and determining from the received documentation data current progress of each construction activity and updating the stored documentation schedule in accordance with the determined current progress of each construction activity such that subsequently generated data acquisition instructions are generated in accordance with the updated documentation schedule.

2. The computer-readable memory medium of claim 1 wherein the method further comprises:

updating the contract document data to include received indications of construction changes such that subsequently generated data acquisition instructions are generated in accordance with the updated contract documents.

3. The computer-readable memory medium of claim 1 wherein the data acquisition instructions include descriptions that instruct how to document a plurality of aspects of each construction activity.

4. The computer-readable memory medium of claim 1 wherein the data acquisition instructions for the plurality of construction activities to be documented further include documentation protocols that indicate further opportunities for documentation data acquisition.

5. The computer-readable memory medium of claim 4 wherein the documentation protocols regard at least one of industry knowledge and guidelines, construction activity, equipment types, site conditions, people, material, quality, or safety.

6. The computer-readable memory medium of claim 1 wherein the method further comprises:

generating and storing in the computer system memory a set of project-specific terminology for use in documenting the construction project in a uniform manner; and generating and publishing the data acquisition instructions using the project-specific terminology.

7. The computer-readable memory medium of claim 1 wherein the method further comprises:

determining and storing in the computer system memory a set of documentation protocols and terminology for the construction project; and generating the data acquisition instructions to include a portion of the determined protocols and consistent with determined terminology so that received documentation data is uniform across the construction project.

8. The computer-readable memory medium of claim 1 wherein the method further comprises:

integrating the received documentation data into a plurality of retrievable images that provide historical documentation of the construction project.

9. The computer-readable memory medium of claim 1 wherein the method further comprises:

integrating the received documentation data into a plurality of retrievable images that provide near real-time documentation of the construction project.

10. The computer-readable memory medium of claim 1 wherein the method further comprises:

verifying the received documentation data; and integrating the verified documentation data into a plurality of retrievable images that provide documentation of the construction project.

11. The computer-readable memory of claim 10 wherein the verifying the received documentation data comprises:

enhancing an image; and modifying descriptions associated with the image as necessary to be consistent with what the image shows.

12. The computer-readable memory medium of claim 11 wherein the method further comprises:

confirming that a scheduled event is associated with an open or closed status.

13. The computer-readable memory medium of claim 1 wherein the method further comprises:

automatically generating progress payment reports that reflect progress of construction activities.

14. The computer-readable memory medium of claim 13 wherein the automatically generating progress payment reports is triggered by an event scheduled in the documentation data schedule.

15. The computer-readable memory medium of claim 13 wherein the method further comprises:

automatically communicating the generated progress payment reports by electronic means.

16. The computer-readable memory medium of claim 1 wherein the method further comprises:

at a determined time, automatically generating a report that contains documentation data that documents progress and/or aspects of the construction project.

17. The computer-readable memory medium of claim 16 wherein the determined time is a time interval, a predetermined time, a calculated time, based upon a calendared event, or in response to a request.

18. The computer-readable memory medium of claim 16 wherein the report documents at least one of project progress, aspects of the construction project, or particular features of the construction being built.

19. The computer-readable memory medium of claim 16 wherein the method further comprises:
automatically communicating the generated progress payment reports by electronic means.

20. The computer-readable memory medium of claim 1 wherein the method further comprises:
integrating the received documentation data into a plurality of retrievable images that provide documentation of the construction project over a period of time;
receiving a request to retrieve and display at least one of the retrievable images based upon a construction-related selection criteria; and
displaying at least one image in response to the received request.

21. The computer-readable memory medium of claim 20 wherein a plurality of images are displayed in response to the request and wherein the method further comprises:
displaying a first one of the plurality of images and a second one of the plurality of images approximately simultaneously such that a viewer can view both images at the same time and manipulate each image independently.

22. The computer-readable memory medium of claim 21 wherein the first image represents a structure of the construction project at a first time and the second image represents the structure at a second time allowing the structure to be analyzed over a time period that includes the first time and second time.

23. The computer-readable memory medium of claim 21 wherein the first image represents a system of the construction project at a first time and the second image represents the system at a second time allowing the system to be analyzed over a time period that includes the first time and second time.

24. The computer-readable memory medium of claim 23 wherein the system is an aspect of an electrical, plumbing, or mechanical system.

25. The computer-readable memory medium of claim 21 wherein the manipulation comprises a zooming operation.

26. The computer-readable memory medium of claim 21 wherein the first image shows a first subject of the construction project and the second image shows a second subject that is not the same as the first subject, yet the images are both associated with a same contract document.

27. The computer-readable memory medium of claim 20, the displayed at least one image associated with a geographical area, and wherein the method further comprises:
displaying a linked field associated with the displayed at least one image such that, upon selection of a value of the linked field, automatically displaying at least one related image from a related geographical area that encompasses, surrounds, or is in proximity to the geographical area associated with the displayed at least one image.

28. The computer-readable memory medium of claim 27 wherein the related geographical area is defined by at least one of a grid location, a level, a room, or a reference to a contract drawing or specification.

29. The computer-readable memory medium of claim 27 wherein the linked field is used to specify the geographical area that encompasses, surrounds or is in proximity to the geographical area associated with the displayed at least one image.

30. The computer-readable memory medium of claim 20, the displayed at least one image associated with a group, and wherein the method further comprises:
displaying a linked field associated with the displayed at least one image such that, upon selection of a value of the linked field, automatically displaying at least one related image from a related group that is associated with or is the same as the group associated with the displayed at least one image.

31. The computer-readable memory medium of claim 30 wherein the related group is defined by at least one of a reference tag, a change indication document, or a construction subject area, or a reference to a CSI category or subcategory.

32. The computer-readable memory medium of claim 30 wherein the linked field is used to specify the related group that is associated with or is the same as the group associated with the displayed at least one image.

33. The computer-readable memory medium of claim 1 wherein the method further comprises:
integrating the received documentation data into a plurality of retrievable images that provide "as-built" documentation of the construction project.

34. The computer-readable memory medium of claim 33 wherein the "as-built" documentation comprises "as-built" documentation for structural or framing aspects of the construction project.

35. The computer-readable memory medium of claim 33 wherein the "as-built" documentation comprises "as-built" documentation for electrical, mechanical, or plumbing systems constructed by the construction project.

36. A computer-readable memory medium containing content that, when executed, causes a computer system to track construction to produce "as-built" documentation of a construction project, by performing a method comprising:
receiving data from a plurality of construction contract documents;
during construction of a structure designated by the received data from the contract documents, receiving a first data acquisition image that represents the structure relative to a first period of time and a second data acquisition image that represents the structure relative to a second period of time; and
automatically creating "as-built" documentation for the structure from the first image and the second image such that, when the construction of the structure is completed, the first and second images provide a record of systems and/or structures that have been installed as part of the resultant structure.

37. The computer-readable memory medium of claim 36 wherein the automatically creating the "as-built" documentation further comprises:
automatically creating "as-built" documentation for the structure from the first image and the second image, wherein an internal feature of the structure that is no longer observable is shown in at least one of the images.

38. The computer-readable memory medium of claim 36 wherein the images are used to show hidden systems behind a covered or closed structure.

39. The computer-readable memory medium of claim 38 wherein the hidden systems comprise plumbing, mechanical, fire protection, or electrical systems.

40. The computer-readable memory medium of claim 36 wherein the "as-built" documentation is used to provide information for future maintenance.

41. The computer-readable memory medium of claim 36 wherein the "as-built" documentation is used to provide information for at least one of later expansion or renovation.

42. A computer-readable memory medium containing content that, when executed, causes a computer system to produce documentation of construction methodologies for a plurality of construction projects, by performing a method comprising:

receiving data from a plurality of construction contract documents for the plurality of construction projects;

during construction of at least one structure as part of one of the construction projects, receiving a plurality of data acquisition images that represent the structure relative to different periods of time; and from the received images, automatically creating a library of construction methodologies that can be indexed and retrieved across the plurality of construction projects.

43. The computer-readable memory medium of claim 42 wherein the construction methodologies includes construction sequencing and material handling information.

44. A computer-readable memory medium containing content that, when executed, causes a computer system to measure construction elements displayed in electronic images that document a construction project, comprising:

retrieving and displaying an image that shows a construction structure or a construction system in a portion of the construction project;

receiving a first measurement of a known element in the structure or system shown in the displayed image;

storing the received first measurement of the known element as a calibration measure;

receiving a user selection of a first construction element in the displayed image that is to be measured, the first construction element having an unknown dimension;

using the calibration measure to automatically calculate the dimension of the first construction element; and displaying the calculated dimension.

45. The computer-readable memory medium of claim 44 wherein the known element and the first construction element that is to be measured are located in approximately the same vertical plane as a vertical plane that encompasses the known element shown in the displayed image.

46. The computer-readable memory medium of claim 44 wherein the using the calibration measure to automatically calculate the dimension is performed in response to receiving an indication that a calibration tool from a toolbar has been selected.

47. The computer-readable memory medium of claim 44 wherein the method further comprises:

using the calibration measure to automatically calculate the dimension of a second, a third, and a fourth construction element, wherein the first, second, third, and fourth constructions elements together define a perspective plane;

displaying a perspective grid to illustrate the perspective plane;

receiving an indication of another construction element located within the perspective plane that has an unknown dimension;

automatically calculating the unknown dimension of the another construction element located within the perspective plane.

48. The computer-readable memory medium of claim 47 wherein the method further comprises:

receiving an indication of size of grid lines to be displayed in the perspective grid; and displaying the perspective grid according to the indicated size.

49. The computer-readable memory medium of claim 47 wherein the method further comprises:

receiving an indication that the perspective grid has been resized to a new size;

recalculating the perspective plane according to the new size;

redisplaying the image according to the new size; and displaying a new perspective grid according to the recalculated perspective plane.

* * * * *